US011536178B2

(12) United States Patent
Hiltzik et al.

(10) Patent No.: US 11,536,178 B2
(45) Date of Patent: Dec. 27, 2022

(54) EVAPORATIVE FUEL VAPOR EMISSION CONTROL SYSTEMS

(71) Applicant: Ingevity South Carolina, LLC, North Charleston, SC (US)

(72) Inventors: Laurence H. Hiltzik, Charleston, SC (US); Peter D. Mccrae, Covington, VA (US); James R. Miller, Mount Pleasant, SC (US); Roger S. Williams, Daniel Island, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 17/179,730

(22) Filed: Feb. 19, 2021

(65) Prior Publication Data

US 2021/0170324 A1    Jun. 10, 2021

Related U.S. Application Data

(63) Continuation of application No. 15/028,293, filed as application No. PCT/US2014/033565 on Apr. 9, (Continued)

(51) Int. Cl.
*B01J 20/28* (2006.01)
*F02M 25/08* (2006.01)
(Continued)

(52) U.S. Cl.
CPC ....... *F01N 3/0835* (2013.01); *B01D 53/0407* (2013.01); *B01D 53/0415* (2013.01);
(Continued)

(58) Field of Classification Search
CPC . F01N 3/0835; F01N 3/0807; B01D 53/0407; B01D 53/0415; B01D 2253/102;
(Continued)

(56) References Cited

U.S. PATENT DOCUMENTS 3,844,739 A   10/1974 Turner et al.
4,677,086 A    6/1987 McCue et al.
(Continued)

FOREIGN PATENT DOCUMENTS

DE        10049537     4/2002
DE     102004063434     7/2006
(Continued)

OTHER PUBLICATIONS

Decision—Regarding Post Grant Review for PGR2020-00035—U.S. Pat. No. 10,323,553—Sep. 10, 2020.
(Continued)

*Primary Examiner* — David Hamaoui
(74) *Attorney, Agent, or Firm* — Bryan D. Zerhusen; Nicholas R Herrel; Cantor Colburn LLP

(57) ABSTRACT

An evaporative emission control canister system comprises an initial adsorbent volume having an effective incremental adsorption capacity at 25° C. of greater than 35 grams n-butane/L between vapor concentration of 5 vol % and 50 vol % n-butane, and at least one subsequent adsorbent volume having an effective incremental adsorption capacity at 25° C. of less than 35 grams n-butane/L between vapor concentration of 5 vol % and 50 vol % n-butane. The evaporative emission control canister system has a two-day diurnal breathing loss (DBL) emissions of no more than 20 mg at no more than 210 liters of purge applied after the 40 g/hr BETP butane loading step.

29 Claims, 23 Drawing Sheets

Related U.S. Application Data 2014, now Pat. No. 10,960,342, which is a continuation of application No. PCT/US2013/064407, filed on Oct. 10, 2013.

(60) Provisional application No. 61/712,244, filed on Oct. 10, 2012.

(51) Int. Cl.

| | | |
|---|---|---|
| *F01N 3/08* | (2006.01) | |
| *B01D 53/04* | (2006.01) | |
| *B01J 20/20* | (2006.01) | |
| *F02M 35/10* | (2006.01) | |

(52) U.S. Cl.
CPC ......... *B01J 20/20* (2013.01); *B01J 20/28045* (2013.01); *F01N 3/0807* (2013.01); *F02M 25/089* (2013.01); *F02M 25/0854* (2013.01); *F02M 25/0872* (2013.01); *F02M 35/10222* (2013.01); *B01D 2253/102* (2013.01); *B01D 2253/3425* (2013.01); *B01D 2257/70* (2013.01); *B01D 2257/7022* (2013.01); *B01D 2258/02* (2013.01); *B01D 2259/401* (2013.01); *B01D 2259/402* (2013.01); *B01D 2259/404* (2013.01); *B01D 2259/406* (2013.01); *B01D 2259/41* (2013.01); *B01D 2259/4145* (2013.01); *B01D 2259/4516* (2013.01); *B01D 2259/4566* (2013.01); *F02M 2025/0881* (2013.01); *Y02T 10/12* (2013.01)

(58) Field of Classification Search
CPC ........ B01D 2253/3425; B01D 2257/70; B01D 2257/7022; B01D 2258/02; B01D 2259/401; B01D 2259/402; B01D 2259/404; B01D 2259/406; B01D 2259/41; B01D 2259/4145; B01D 2259/4516; B01D 2259/4566; B01J 20/20; B01J 20/28045; F02M 25/0854; F02M 25/0872; F02M 25/089; F02M 35/10222; F02M 2025/0881; F02M 25/08; Y02T 10/12; Y02T 10/146; F02D 41/003

See application file for complete search history.

(56) References Cited

U.S. PATENT DOCUMENTS

| | | |
|---|---|---|
| 4,869,739 A | 9/1989 | Kanome et al. |
| 4,893,072 A | 1/1990 | Matsumoto |
| 4,894,072 A | 1/1990 | Turner et al. |
| 5,039,651 A | 8/1991 | Kosaka et al. |
| 5,204,310 A | 4/1993 | Tolles et al. |
| 5,206,207 A | 4/1993 | Tolles |
| 5,207,808 A | 5/1993 | Haruta et al. |
| 5,238,470 A | 8/1993 | Tolles et al. |
| 5,250,491 A | 10/1993 | Yan |
| 5,276,000 A | 1/1994 | Matthews et al. |
| 5,304,527 A | 4/1994 | Dimitri |
| 5,324,703 A | 6/1994 | McCue et al. |
| 5,337,721 A | 8/1994 | Kasuyu et al. |
| 5,355,861 A * | 10/1994 | Arai .................. F02M 25/0854 123/519 |
| 5,377,644 A | 1/1995 | Krohn |
| 5,408,976 A | 4/1995 | Reddy |
| 5,416,056 A | 5/1995 | Baker |
| 5,456,236 A | 10/1995 | Wakashiro et al. |
| 5,456,237 A | 10/1995 | Yamazaki et al. |
| 5,460,136 A | 10/1995 | Yamazaki et al. |
| 5,477,836 A | 12/1995 | Hyodo et al. |
| 5,482,023 A | 1/1996 | Hunt et al. |
| 5,510,063 A | 4/1996 | Gadharee et al. |
| 5,538,932 A | 7/1996 | Yan et al. |
| 5,564,398 A | 10/1996 | Maeda et al. |
| 5,687,697 A | 11/1997 | Ishikawa |
| 5,691,270 A | 11/1997 | Miller |
| 5,736,481 A | 4/1998 | Miller |
| 5,736,485 A | 4/1998 | Miller |
| 5,769,928 A | 6/1998 | Leavitt et al. |
| 5,863,858 A | 1/1999 | Miller et al. |
| 5,914,294 A | 6/1999 | Park et al. |
| 5,914,457 A | 6/1999 | Itakura et al. |
| 5,931,141 A | 8/1999 | Chino |
| 5,957,114 A | 9/1999 | Johnson |
| 6,098,601 A | 8/2000 | Reddy |
| 6,136,075 A | 10/2000 | Bragg et al. |
| 6,171,373 B1 | 1/2001 | Park et al. |
| 6,215,037 B1 | 4/2001 | Padin et al. |
| 6,279,548 B1 * | 8/2001 | Reddy ............... B60K 15/03504 123/557 |
| 6,284,705 B1 | 9/2001 | Park et al. |
| 6,488,748 B2 | 12/2002 | Yamafuji et al. |
| 6,537,355 B2 | 3/2003 | Scardino et al. |
| 6,540,815 B1 * | 4/2003 | Hiltzik ............... F02M 25/0854 95/146 |
| 6,811,717 B2 | 11/2004 | Iyengar et al. |
| 6,896,852 B1 | 5/2005 | Meiller et al. |
| RE38,844 E | 10/2005 | Hiltzik |
| 7,114,492 B2 * | 10/2006 | Reddy ....................... F01N 5/02 123/518 |
| 7,666,507 B2 * | 2/2010 | Ishikawa ................ B60K 15/00 428/408 |
| 7,708,817 B2 * | 5/2010 | Hurley ................. F02M 35/046 96/153 |
| 7,753,034 B2 * | 7/2010 | Hoke ..................... B01D 53/02 123/518 |
| 7,789,075 B2 | 9/2010 | Makino |
| 8,864,877 B2 * | 10/2014 | Nishita .................. B01D 53/04 95/146 |
| 9,005,352 B2 | 4/2015 | Mani et al. |
| 9,732,649 B2 * | 8/2017 | Hiltzik ............... B01D 53/0415 |
| 10,280,820 B2 | 5/2019 | Hiltzik et al. |
| 10,323,553 B2 | 6/2019 | Hiltzik et al. |
| 10,422,261 B2 | 9/2019 | Hiltzik et al. |
| 10,960,342 B2 | 3/2021 | Hiltzik et al. |
| 2001/0020418 A1 | 9/2001 | Yuji |
| 2002/0073847 A1 | 6/2002 | Sheline et al. |
| 2002/0124732 A1 | 9/2002 | Hara et al. |
| 2003/0005912 A1 | 1/2003 | Koyama et al. |
| 2005/0014642 A1 | 1/2005 | Oi et al. |
| 2005/0132888 A1 | 6/2005 | Wolff et al. |
| 2005/0247202 A1 | 11/2005 | Seki |
| 2007/0078056 A1 | 4/2007 | Abe |
| 2007/0266997 A1 | 11/2007 | Clontz |
| 2008/0041226 A1 | 2/2008 | Hiltzik |
| 2010/0107581 A1 | 5/2010 | Mochizuki et al. |
| 2010/0212496 A1 | 8/2010 | Tetsya |
| 2011/0067994 A1 | 3/2011 | Moorhead |
| 2011/0168025 A1 * | 7/2011 | Huynh ............... F02M 25/0854 96/126 |
| 2011/0214572 A1 | 9/2011 | Hasegawa |
| 2012/0186563 A1 | 7/2012 | Hasegawa et al. |
| 2012/0204720 A1 | 8/2012 | Tschantz |
| 2013/0037006 A1 | 2/2013 | Kosugi et al. |
| 2013/0160651 A1 | 6/2013 | Mani |
| 2013/0186375 A1 | 7/2013 | Hasegawa |
| 2013/0269521 A1 | 10/2013 | Nishita |
| 2014/0352542 A1 | 12/2014 | Mani |
| 2019/0390585 A1 | 12/2019 | Hiltzik et al. |
| 2020/0018265 A1 * | 1/2020 | Chen ................. F02M 25/0854 |
| 2021/0170324 A1 | 6/2021 | Hiltzik et al. |
| 2022/0074331 A1 | 3/2022 | Hiltzik et al. |
| 2022/0127985 A1 | 4/2022 | Hiltzik et al. |

FOREIGN PATENT DOCUMENTS

| | | |
|---|---|---|
| EP | 0395353 A2 | 10/1990 |
| EP | 0899450 | 3/1999 |
| EP | 1094032 | 4/2001 |
| EP | 1113163 | 7/2001 |

(56) References Cited

FOREIGN PATENT DOCUMENTS

| | | |
|---|---|---|
| EP | 1491755 A2 | 12/2004 |
| EP | 2906811 | 2/2018 |
| JP | S 59226263 | 12/1984 |
| JP | S 63176650 | 7/1988 |
| JP | H1037812 | 2/1998 |
| JP | 2010-339218 | 12/1998 |
| JP | 2002-235610 | 8/2002 |
| JP | 2002-266709 | 9/2002 |
| JP | 2002-256989 | 11/2002 |
| JP | 2012-031784 | 2/2012 |
| JP | 2012-031785 A | 2/2012 |
| JP | 2013-177889 | 9/2013 |
| KR | 2002 012826 | 2/2002 |
| WO | WO 1992-001585 | 2/1992 |
| WO | WO 2001-062367 | 8/2001 |
| WO | WO 2004/110928 | 12/2004 |
| WO | WO 2009/061533 A1 | 5/2009 |
| WO | WO 2015/053815 A1 | 4/2015 |

OTHER PUBLICATIONS

Decision—Regarding Post Grant Review for PGR2020-00037—U.S. Pat. No. 10,323,553—Sep. 10, 2020.
Patent Owner's Sur-Reply, U.S. Pat. No. 10,323,553—Case PGR2020-00037—May 28, 2021.
Petition for Post Grant Review of U.S. Pat. No. 10,323,553—Case PGR2020-00035—Mar. 2, 2020.
Petition for Post Grant Review of U.S. Pat. No. 10,323,553—Case PGR2020-00037—Mar. 2, 2020.
Petitioner's Reply to Patent Owner's Response U.S. Pat. No. 10,323,553—Case PGR2020-00037—Apr. 30, 2021.
Third Party Observations—May 28, 2021—EP 18156041.9 (with translation).
Third Party Observations—May 28, 2021—EP 19217394.6 (with translation).
"Adsorption of p-Nitrophenol on Polymeric Adsorbents" Ardelean et al., Chem Bull "Politechnica" Univ Timisoara vol. 55 (69) 2010 p. 132.
"High surface area nanoporous polymers for reversible hydrogen storage" Germain et al., Chem Mater 2006, vol. 18, pp. 4430-4435.
"Mesoporous high-surface-area activated carbon" Hu Z. et al., Microporous and Mesoporous Materials 43 (2001) pp. 267-275.
"Performance of activated carbon in Evaporative Loss Control System's", Johnson, HR and Williams R.—SAE Technical Paper 902119, 1990.
"Phenolic resins: chemistry, applications, standardization, safety and ecology" 2nd Edn Springer-Verlag, 2000, pp. 444-445.
"Properties and Thermodynamics of adsorption of benzoic acid onto XAD-4 and a water-compatible hypercrosslinked adsorbent", Liu et al., Chinese Journal of Polymer Science vol. 21, No. 3, 2003, pp. 317-324.
Assembly Bill of Material.
ASTM (D5228-92) Test .Protocol for BWC (A9 in the notice of opposition of Jun. 26, 2013).
Clean Air Technology Center, et al., "Choosing an Adsorption System for VOC: Carbon, Zeolite, or Polymers", EPA Technical Bulletin, 456/F-99-004 May 1999.
Communication Pursuant to Rule 114(2) EPC, dated Aug. 27, 2019, Third-Party Observations filed, for European patent application EP181821.4.
Invoices of the sale of canister 18098125 in 1999.
Curriculum Vitae of James Lyons, filed with Petition for Inter Partes Review of U.S. Pat. No. RE38,844, filed Nov. 5, 2018 (1004).
Declaration by James M. Lyons in support of Petition for Inter Partes Review of U.S. Pat. No. RE38,844, filed Nov. 5, 2018 (1003).
Declaration by Warren Smith in support of Petition for Inter Partes Review of U.S. Pat. No. RE38,844, filed Nov. 5, 2018 (1014).
Delphi test report on M50115 foam.
EP Opposition filed Nov. 6, 2018, by BASF Corp, for EP Patent No. EP2906811.
EPA (40CFR 86/132-96) Test Protocol for BWC.
Excerpt from Automotive Manufacturing and Production, 2001.
Excerpt from the book "Surface Chemistry: Theory and Applications".
File History for U.S. Pat. No. RE38,844 (Filed Oct. 21, 2003) (1002).
File History of U.S. Pat. No. 6,540,815 (Issued Apr. 1, 2003) (1006).
Gadkaree, K.P., "Carbon Honeycomb Structures for Adsorption Applications", Carbon vol. 36, No. 7-8, pp. 981-989, 1998 (1018).
Hassler, John W., "Activated Carbon", Chemical publishing Company, New York, 1963, pp. 300-310.
International Search Report and Written Opinion, dated Aug. 27, 2014, for PCT/US2014/033565.
International Search Report and Written Opinion, dated Mar. 31, 2014, for PCT/US2013/064407.
Japanese Office Action issued for Japanese Patent Application No. 2018-212932, dated Jan. 6, 2020 (English translation).
Johnson, Philip, et al., Carbon Materials for Advanced Technologies, Chapter 8: Activated Carbon for Automotive Applications, Burchell, ed. (1999) (Edited by Timothy D. Burchell) (1013).
Konrad Dorfner "Ion Exchangers" pp. 663 & 664, Walter de Gruyter, 1991.
Material specification sheet for foam M50115.
Meca, "Evaporative Emission Contol Technologies for Gasoline Powered Vehicles", Dec. 2010 (1020).
Notice of Filing Date Accorded to Petition and Time for Filing Patent Owner Preliminary Response, filed Nov. 5, 2018, PTAB, Case IPR2019-00202, U.S. Pat. No. RE38,844.
Perry's Chemical Engineers' Handbook, 6th Edn, 1984, pp. 11-12.
Petition for Inter Partes Review of U.S. Pat. No. RE38,844, filed Nov. 5, 2018.
Plot of IAC versus BWC submitted by Ingevity to the European Patent Office on Feb. 11, 2014 (1019).
Printout of website showing Delphi canister 17098125 equipping cars from model year 1999 and 2001.
Ross, Sydney et al., "On Physical adsorption", Interscience Publishers, New York-London-Sydney, 1964, pp. 29-78.
Rouquerol, J., et al., "A critical assessment of quasi-equilibrium gas absorption techniques in volumetry, gravimetry or calorimetry", Elsevier Science Publishers B.V., Amsterdam, 1988, pp. 67-76.
SAE Technical Paper 2001-01-0733 titled, "Impact and Control of Canister Bleed Emissions" by RS Williams and CR Clontz (2001).
SAE, "Effects of Low-Purge Vehicle Applications and Ethanol-Containing Fuels on Evaporative Emissions Canister Performance", 2007-01-1929, 2007051, Clontz, R., et al. (2007).
SAE, "Studies on Carbon Canisters to SatisfyLEVII EVAP Regulations", Itakura, et al., SAE Technical Paper Series 2000-01-0895, Mar. 6-9, 2000 (1028).
Sae, "The Development of Real-time Evaporative Emission Test", Haskew, et al., SAE Technical Paper Series 901110, May 1-4, 1990 (1027).
Smisek, Milan et al., "Active Carbon, Manufacture, Properties and Applications", Elsevier publishing Company, Amsterdam-London-New York, 1970, pp. 353-375.
Technical drawings of canister 17098125.
U.S. Appl. No. 60/335,897 (Nov. 21, 2001) (1007).
U.S. Appl. No. 15/028,293, filed Apr. 8, 2016, 2016-0271555-A1.
Ingevity South Carolina, LLC's Patent Owner's Preliminary Response Dated Jun. 12, 2020—PGR2020-00035.
Petitioner's Reply to Patent Owner's Preliminary Response Dated Jul. 23, 2020—PGR2020-00035.
Patent Owner Ingevity South Carolina, LLC's Sur-Reply Dated Jul. 30, 2020—PGR2020-00035.
Decision Denying Institution of Post-Grant Review Dated Sep. 10, 2020—PGR2020-00035.
Ingevity South Carolina, LLC's Patent Owner's Preliminary Response Dated Jun. 12, 2020—PGR2020-00037.
Petitioner's Reply to Patent Owner's Preliminary Response Dated Jul. 31, 2020—PGR2020-00037.
Patent Owner Ingevity South Carolina, LLC's Sur-Reply Dated Aug. 7, 2020—PGR2020-00037.
Decision Granting Institution of Post-Grant Review Dated Sep. 10, 2020—PGR2020-00037.

(56) References Cited

OTHER PUBLICATIONS

Judgment—Final Written Decision Determining No Challenged Claims Unpatentable Dismissing Motions to Exclude as Moot Dated Sep. 9, 2021—PGR2020-00037.
Yamasaki, K., et al., Analysis of Butane Diffusion in Activated Carbon Canister, SAE Int. J. Fuels Lubr., vol. 2., Issue 1, pp. 455-461, Jan. 2009 (Ex 1029).
U.S. Appl. No. 61/712,244 (Ex 1006) Oct. 10, 2012.
SAE Technical Program Matrix (Ex 1027) Jul. 25, 2007.
SAE Mobilus Clontz, Jan. 2007 (Ex 1033).
SAE Fuels and Lubricants Meeting presentation list (Jul. 2007) (Ex 1028).
Lyons IAC Calculations (Ex 1036)—(Lyons Dec filed Nov. 5, 2018).
ITC Markman Hearing, Jun. 4, 2019 (Ex 1040).
Isotherm Comparison Data—Jan. 23, 2020 (Ex 1034) (Accompanys Dec of Laif R. Alden dated Mar. 2, 2020).
ISO 9277—Determination of the specific surface area of solids by gas adsorption—BET Method, Sep. 1, 2010 (Ex 1016).
Intertek Report, Jan. 3, 2020 (Ex 1020).
IGV Investor Day Presentation, Feb. 21, 2018 (Ex 2018).
Graft—BWC versus Incremental Butane Capacity, Nov. 2014 (Ex 1011).
Patent File History for U.S. Pat. No. 10,323,553 (Aug. 14, 2017 to Jun. 18, 2019).
EPO Opposition for EP02748109.2, Apr. 22, 2015 (Ex 1015).
SAE Technical Paper Series, 2015-36-0319, Sep. 22, 2015 (Ex 1031).
Belmabkhout, M., et al., High-pressure adsorption measurements. A comparative study of the volumetric and gravimetric methods, Meas. Sci Technol. 15 (2004) 848-858 (Ex 1021).
ASTM D5228—Standard Test Method for Determination of Butane Working Capacity of Activated Carbon, Oct. 2005, (Ex 1022).
Declaration by Laif R. Alden, Mar. 2, 2020 (Ex 1035).
Dolch, J., Effects of 7,9, and 10 psi Vapor Pressure Fuels on Multi-Day Diurnal Evaporative Emissions of Tier 2 and LEV II Vehicles, SAE International J. Fuels Lubr. vol 6., Issue 2, Jun. 2013, pp. 382-392 (Ex 1030).

Docket—Court of Appeals 22-1129—*BASF* v *IGV* PGR2020-00037 (dated Feb. 2, 2022).
*BASF* v *IGV* PGR2020-00037—Appellees's (IGV) Motion to Dismiss Appeal dated Jan. 7, 2022.
*BASF* v *IGV* PGR2020-00037—BASF Response to Motion to Dismiss Appeal dated Feb. 1, 2022.
1. Appellant's Motion for Extension of Time to File Response to Motion to Dismiss Appeal—PGR2020-00037 dated Jan. 10, 2022 (No. 10).
2. Order on Motion—22-1129, dated Jan. 11, 2022 (No. 11).
3. Appellee's Unopposed Motion for Extension of Time to File Reply to Support of Motion to Dismiss—22-1129 dated Jan. 26, 2022 (No. 13).
4. BASF Corporation's Response Brief in Opposition to Ingevity South Carolina, LLC's Motion to Dismiss—Non-Confidention Version—22-1129 dated Feb. 1, 2022 (No. 15).
5. Order on Motion—2-1129 dated Feb. 2, 2022 (No. 17).
6. Appellee's Reply in Support of Motion to Dismiss Appeal 0 22-1129 dated Feb. 22, 2022 (No. 19).
7. Order on Motion—22-1129 dated Apr. 13, 2022 (No. 20).
8. BASF Corporation's Motion for Extension of Time to File Opening Brief—22-1129 dated May 27, 2022 (No. 21).
9. Datasheet and Decision of May 12, 2022 Proceeding—EP Board of Appeals—Pub No. 2906811 dated Jun. 9, 2022.
10. Termination of Opposition Proceedings—EP Board of Appeals—Pub No. 2906811 dated Jun. 10, 2022.
11. Petitoner's Response to Patent Owner's Motion to Expunge Exhibit 1041—PGR2020-00037 dated Nov. 8, 2021.
12. Petitoner's Notice of Appeal—PGR2020-00037 dated Nov. 5, 2021.
13. Patent Owner Ingevity South Carolina, LLC's Motion to Expunge Exhibit 1041 PGR2020-00037 dated Oct. 7, 2021 (with Exhibit 1041—redacted).
14. Order Denying Patent Owner's Motion to Expunge without Prejudice—PGR2020-00037 dated Jan. 14, 2022.
15. Court of Appeals 22-1129—Docket as of Jun. 24, 2022.
U.S. Appl. No. 15/028,293, filed Apr. 8, 2016, U.S. Pat. No. 10,960,342 B2.

\* cited by examiner

FIGURE 9
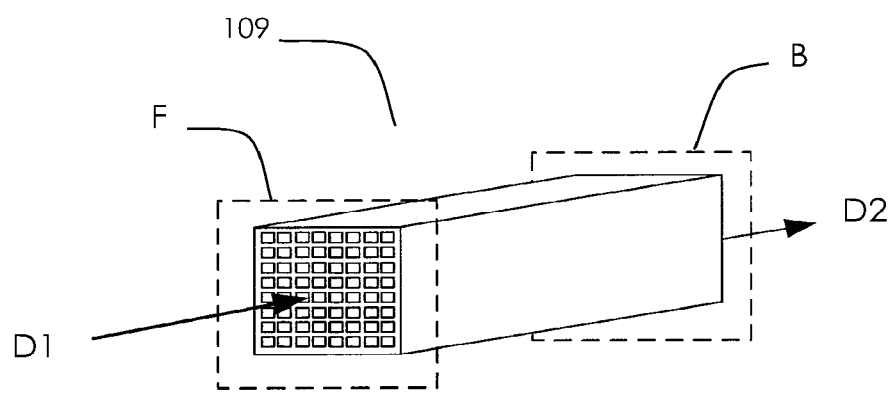
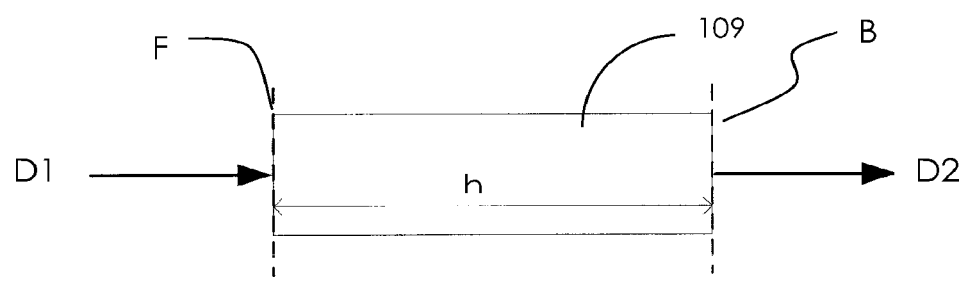
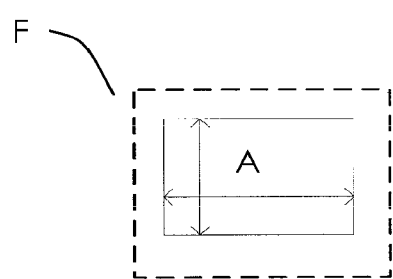

FIGURE 10
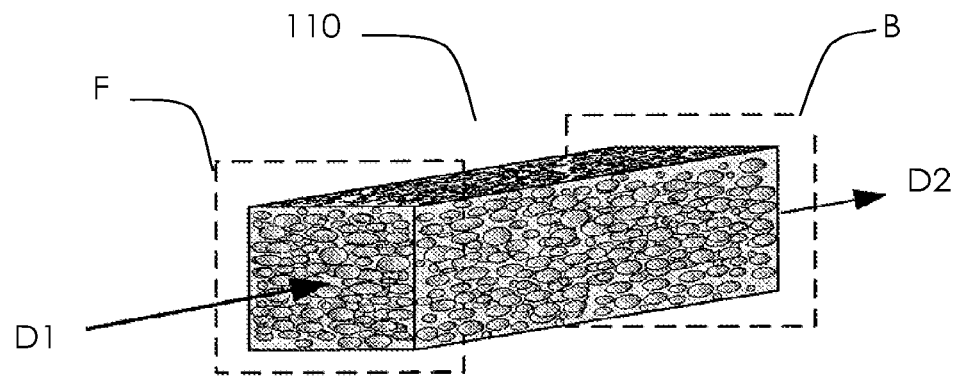
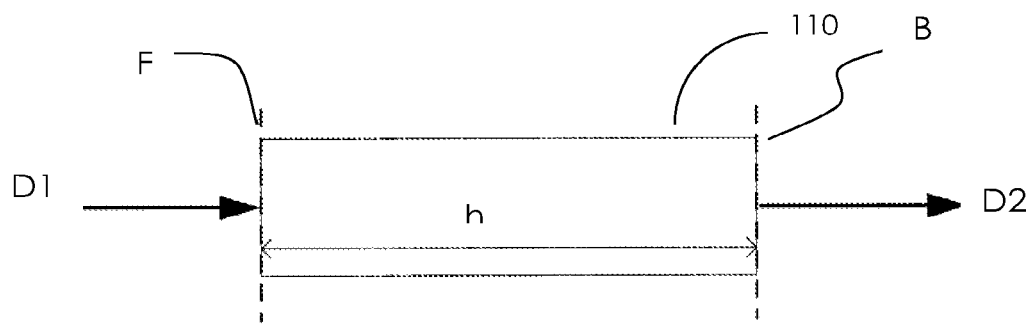
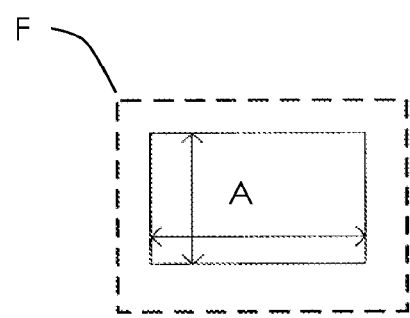

FIGURE 11
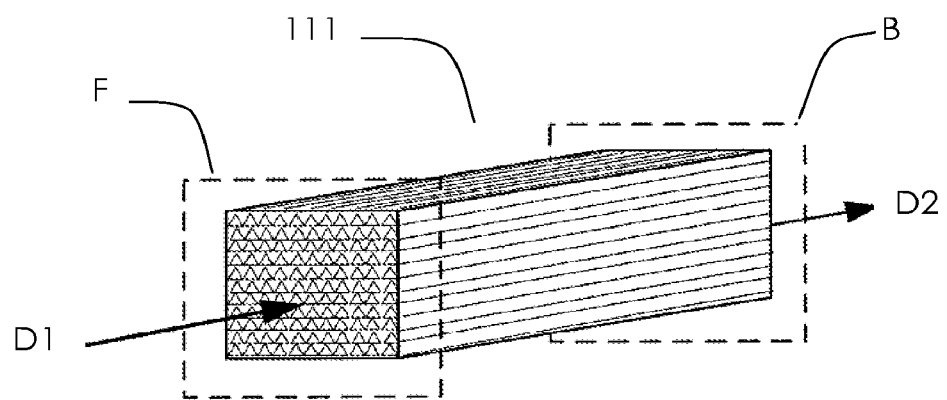
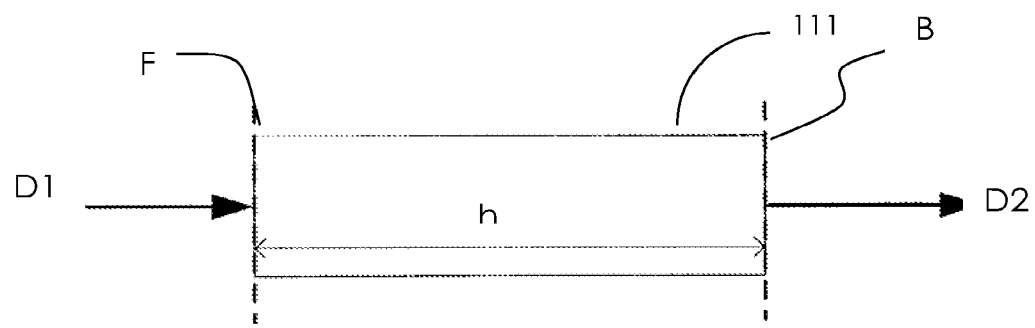
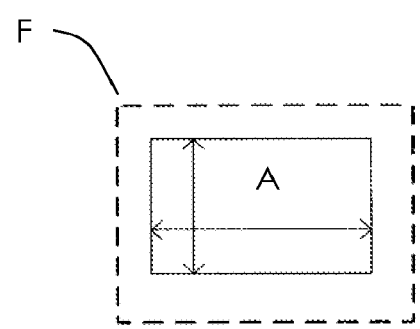

FIGURE 12
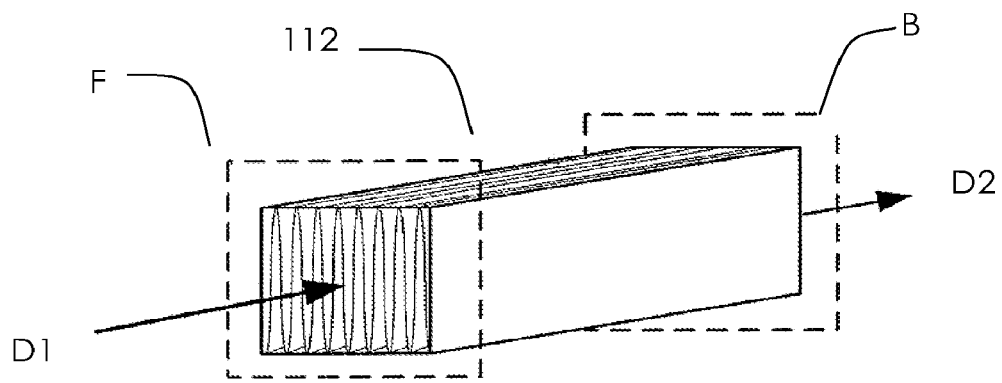
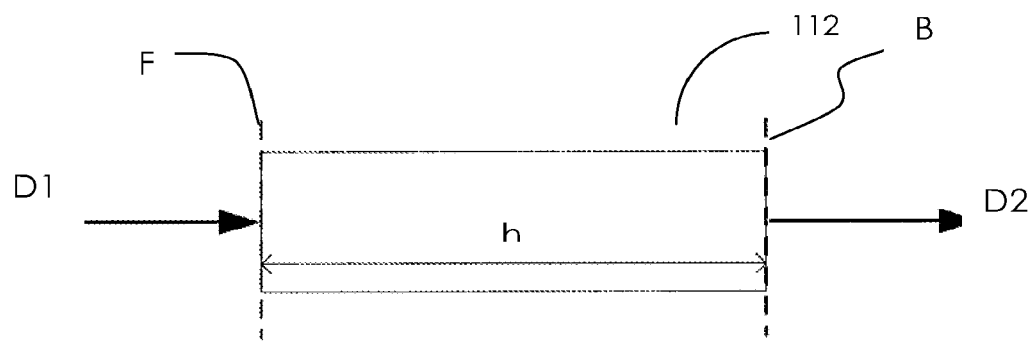
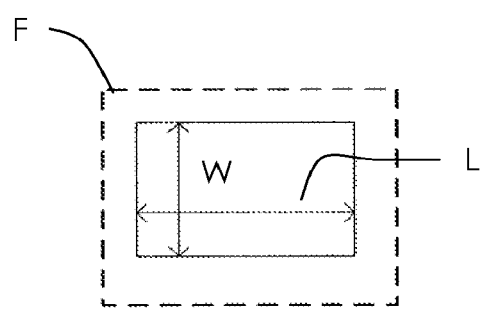

FIGURE 15
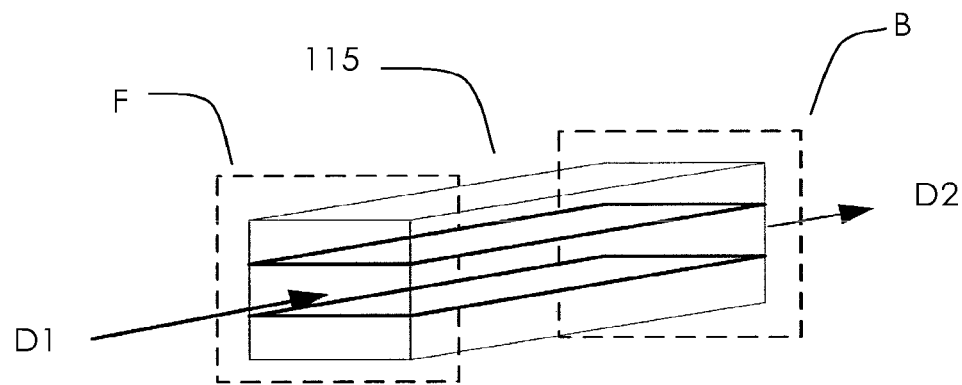
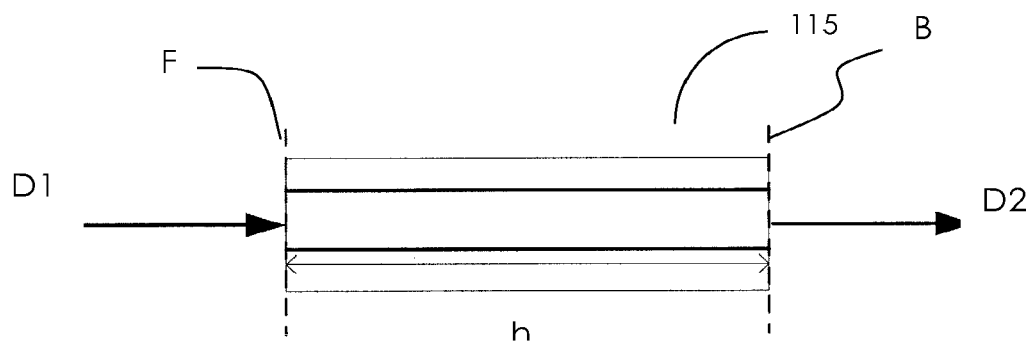
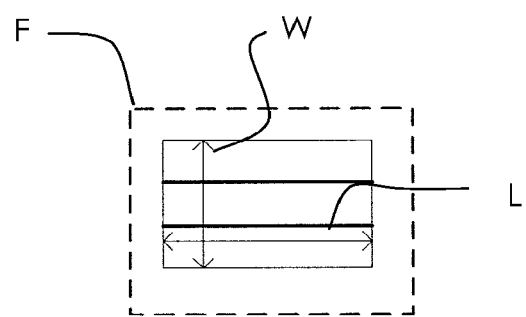

FIGURE 20
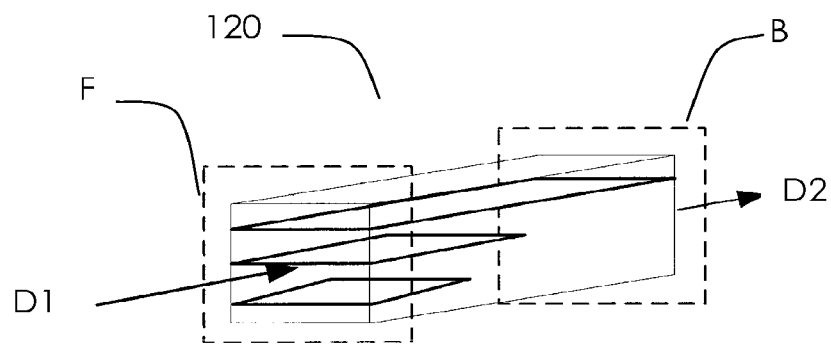
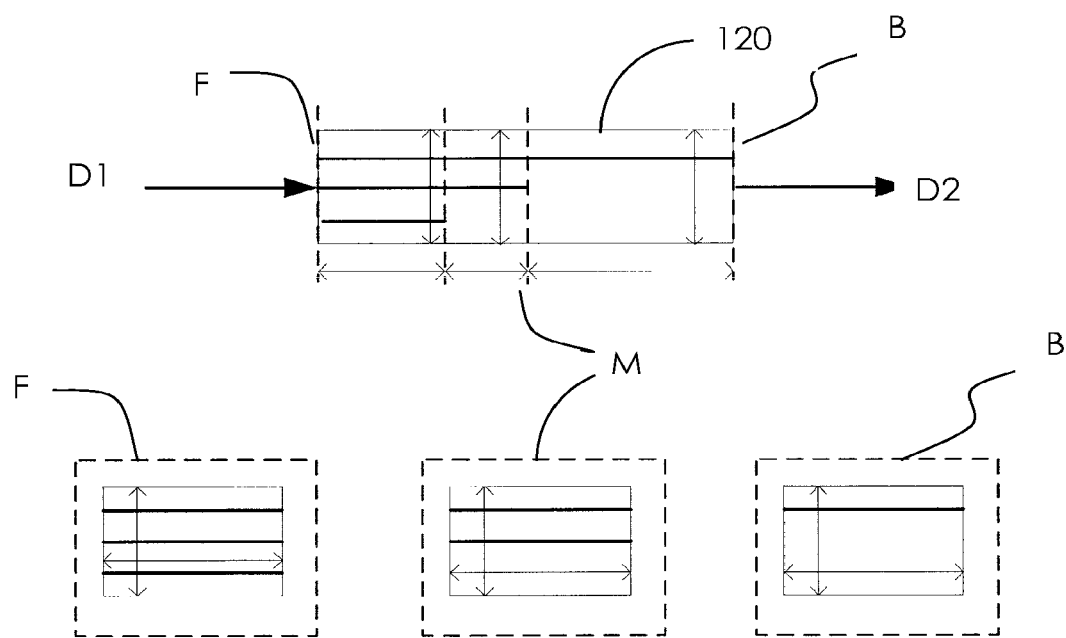

EVAPORATIVE FUEL VAPOR EMISSION CONTROL SYSTEMS

CROSS REFERENCE TO RELATED APPLICATIONS

The present disclosure is a continuation application of U.S. patent application Ser. No. 15/028,293, filed 8 Apr. 2016, which claims the benefit of International Patent Application serial No. PCT/US2014/033565, filed on 9 Apr. 2014, which is a continuation of PCT/US2013/064407, filed on 10 Oct. 2013, titled, EVAPORATIVE FUEL VAPOR EMISSION CONTROL SYSTEMS, which claims the benefit of U.S. Provisional Application No. 61/712,244, filed on 10 Oct. 2012; all of which are incorporated herein by reference in their entirety for all purposes.

TECHNICAL FIELD

The present disclosure, in various embodiments, relates generally to evaporative emission control systems. More particularly, the present disclosure relates to evaporative fuel vapor emission control systems.

BACKGROUND

Evaporation of gasoline fuel from motor vehicle fuel systems is a major potential source of hydrocarbon air pollution. Such emissions can be controlled by the canister systems that employ activated carbon to adsorb the fuel vapor emitted from the fuel systems. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

An increase in environmental concerns has continued to drive strict regulations of the hydrocarbon emissions from motor vehicles even when the vehicles are not operating. When a vehicle is parked in a warm environment during the daytime heating (i.e., diurnal heating), the temperature in the fuel tank increases resulting in an increased vapor pressure in the fuel tank. Normally, to prevent the leaking of the fuel vapor from the vehicle into the atmosphere, the fuel tank is vented through a conduit to a canister containing suitable fuel adsorbent materials that can temporarily adsorb the fuel vapor. A mixture of fuel vapor and air from the fuel tank enters the canister through a fuel vapor inlet of the canister and diffuses into the adsorbent volume where the fuel vapor is adsorbed in temporary storage and the purified air is released to the atmosphere through a vent port of the canister. Once the engine is turned on, ambient air is drawn into the canister system through the vent port of the canister. The purge air flows through the adsorbent volume inside the canister and desorbs the fuel vapor adsorbed on the adsorbent volume before entering the internal combustion engine through a fuel vapor purge conduit. The purge air does not desorb the entire fuel vapor adsorbed on the adsorbent volume, resulting in a residue hydrocarbon ("heel") that may be emitted to the atmosphere. In addition, that heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing losses." The California Low Emission Vehicle Regulations make it desirable for these diurnal breathing loss (DBL) emissions from the canister system to be below 10 mg ("PZEV") for a number of vehicles beginning with the 2003 model year and below 50 mg, typically below 20 mg, ("LEV-II") for a larger number of vehicles beginning with the 2004 model year. Now the California Low Emission Vehicle Regulation (LEV-III) requires canister DBL emissions not to exceed 20 mg as per the Bleed Emissions Test Procedure (BETP) as written in the California Evaporative Emissions Standards and Test Procedures for 2001 and Subsequent Model Motor Vehicles, Mar. 22, 2012.

Several approaches have been reported to reduce the diurnal breathing loss (DBL) emissions. One approach is to significantly increase the volume of purge gas to enhance desorption of the residue hydrocarbon heel from the adsorbent volume. This approach, however, has the drawback of complicating management of the fuel/air mixture to the engine during purge step and tends to adversely affect tailpipe emissions. See U.S. Pat. No. 4,894,072.

Another approach is to design the canister to have a relatively low cross-sectional area on the vent-side of the canister, either by the redesign of existing canister dimensions or by the installation of a supplemental vent-side canister of appropriate dimensions. This approach reduces the residual hydrocarbon heel by increasing the intensity of purge air. One drawback of such approach is that the relatively low cross-sectional area imparts an excessive flow restriction to the canister. See U.S. Pat. No. 5,957,114.

Another approach for increasing the purge efficiency is to heat the purge air, or a portion of the adsorbent volume having adsorbed fuel vapor, or both. However, this approach increases the complexity of control system management and poses some safety concerns. See U.S. Pat. Nos. 6,098,601 and 6,279,548.

Another approach is to route the fuel vapor through an initial adsorbent volume and then at least one subsequent adsorbent volume prior to venting to the atmosphere, wherein the initial adsorbent volume has a higher adsorption capacity than the subsequent adsorbent volume. See U.S. Pat. No. RE38,844.

The regulations on diurnal breathing loss (DBL) emissions continue to drive new developments for improved evaporative emission control systems, especially when the level of purge air is low. Furthermore, the diurnal breathing loss (DBL) emissions may be more severe for a hybrid vehicle that includes both an internal combustion engine and an electric motor. In such hybrid vehicles, the internal combustion engine is turned off nearly half of the time during vehicle operation. Since the adsorbed fuel vapor on the adsorbents is purged only when the internal combustion engine is on, the adsorbents in the canister of a hybrid vehicle is purged with fresh air less than half of the time compared to conventional vehicles. A hybrid vehicle generates nearly the same amount of evaporative fuel vapor as the conventional vehicles. The lower purge frequency and volume of the hybrid vehicle can be insufficient to clean the residue hydrocarbon heel from the adsorbents in the canister, resulting in high diurnal breathing loss (DBL) emissions.

Accordingly, it is desirable to have an evaporative emission control system with low diurnal breathing loss (DBL) emissions even when a low level of purge air is used, or when the adsorbents in the canister are purged less frequently such as in the case of hybrid vehicles, or both. Though a passive approach has been greatly desired, existing passive approaches still leave DBL emissions at levels that are many times greater than the 20 mg LEV-III requirement when only a fraction of the historically available purge is now available.

SUMMARY

Presently described are evaporative fuel emission control systems that are surprisingly and unexpectedly able to reduce DBL emissions to below 20 mg using relatively low purge volumes as determined using BETP. In general, the evaporative emission control systems as described herein include one or more canisters comprising an initial adsorbent volume connected to or in communication (e.g., in vaporous or gaseous) with at least one subsequent adsorbent volume defining a vapor flow path therethrough, and wherein a "step-down" gradient in adsorption capacity exists as vapor flows or diffuses from the initial adsorbent volume towards the one or more subsequent adsorbent volumes. Conversely, the canister system creates a "step-up" gradient as air flows or diffuses from the one or more subsequent adsorbent volumes towards the initial adsorbent volume. In addition, the description provides methods of making and using the same.

As such, in one aspect the description provides an evaporative emissions control system including one or more canisters and comprising an initial adsorbent volume having an effective incremental adsorption capacity at 25° C. of greater than about 35 grams n-butane/L between vapor concentration of 5 vol % and 50 vol % n-butane; and at least one subsequent adsorbent volume having an effective incremental adsorption capacity at 25° C. of less than about 35 grams n-butane/L between vapor concentration of 5 vol % and 50 vol % n-butane, wherein the initial and subsequent adsorbent volumes are in communication, and wherein the canister system has a two-day diurnal breathing loss (DBL) emissions of no more than 20 mg at no more than about 210 liters of purge applied after a 40 g/hr BETP butane loading step.

In certain embodiments, the initial adsorbent volume and subsequent adsorbent volume (or volumes) are in vaporous or gaseous communication and define an air and vapor flow path therethrough. The air and vapor flow path permits or facilitates air and vapor flow or diffusion from one adsorbent volume to the next in the canister system. For example, the air or vapor flow path facilitates the flow or diffusion of fuel vapor sequentially from the initial adsorbent volume to the subsequent adsorbent volume (or volumes).

In certain embodiments, the subsequent adsorbent volume is configured to exhibit at least one of: (i) an approximately uniform air and vapor flow distribution across its flow path cross section, (ii) an effective butane working capacity (BWC) of less than about 3 g/dL and a g-total BWC of from about 2 to about 6 grams, or (iii) a combination thereof. As such, the subsequent adsorbent volume or volumes result in a canister system that has a two-day diurnal breathing loss (DBL) emissions of no more than 20 mg at no more than about 210 liters of purge applied after a 40 g/hr BETP butane loading step. In certain embodiments, the subsequent adsorbent volume comprises an approximately uniform structure that facilitates approximately uniform air and vapor flow distribution across its flow path cross section. In certain embodiments, the canister system comprises a plurality of subsequent adsorbent volumes, e.g., connected in series to the initial adsorbent volume, each of the subsequent adsorbent volumes, independently of the others, being configured to exhibit at least one of: (i) an approximately uniform structure that facilitates uniform air and vapor flow distribution across its flow path cross section, (ii) an effective butane working capacity (BWC) of less than about 3 g/dL and a g-total BWC of from about 2 to about 6 grams, or (iii) a combination thereof.

In any of the embodiments described herein, the initial adsorbent volume and subsequent adsorbent volume(s) may be located within a single canister, separate canisters or a combination of both. For example, in certain embodiments, the system comprises a canister comprising an initial adsorbent volume, and one or more subsequent adsorbent volumes, wherein the subsequent adsorbent volumes are connected to the initial adsorbent volume such that they are in vaporous or gaseous communication forming a vapor flow path, and allowing air and/or vapor to flow or diffuse therethrough. In certain aspects, the canister permits sequential contact of the adsorbent volumes by air or fuel vapor.

In additional embodiments, the system comprises a canister comprising an initial adsorbent volume, and one or more subsequent adsorbent volumes connected to one or more separate canisters comprising at least one additional subsequent adsorbent volume, wherein the subsequent adsorbent volumes are connected to the initial adsorbent volume such that they are in vaporous or gaseous communication defining a vapor flow path, and allowing air and fuel vapor to flow or diffuse therethrough. In certain embodiments, the canister system has a two-day diurnal breathing loss (DBL) emissions of no more than 20 mg at no more than about 100 bed volume of purge applied after the 40 g/hr BETP butane loading step.

In any of the embodiments described herein, the system can further comprise a fuel tank for storing fuel; an engine having an air induction system and adapted to consume the fuel; a fuel vapor inlet conduit connecting the evaporative emission control canister system to the fuel tank; a fuel vapor purge conduit connecting the evaporative emission control canister system to the air induction system of the engine; a vent conduit for venting the evaporative emission control canister system and for admission of purge air to the evaporative emission control canister system or combination thereof, wherein the evaporative emission control canister system is defined by a fuel vapor flow path from the fuel vapor inlet conduit to the initial adsorbent volume toward the subsequent adsorbent volume and the vent conduit, and by an air flow path from the vent conduit to the subsequent adsorbent volume toward the initial adsorbent volume and the fuel vapor purge outlet.

In certain embodiments, the canister system comprises a single subsequent adsorbent volume. In additional embodiments, the canister system comprises multiple subsequent adsorbent volumes. In still additional embodiments, the canister system comprises multiple subsequent adsorbent volumes, wherein each has an effective incremental adsorption capacity at 25° C. independently selected from the range of less than about 35 grams n-butane/L between vapor concentration of 5 vol % and 50 vol % n-butane.

In additional embodiments, the initial adsorbent volume, the subsequent adsorbent volume, or both includes an adsorbent selected from the group consisting of activated carbon, carbon charcoal, zeolites, clays, porous polymers, porous alumina, porous silica, molecular sieves, kaolin, titania, ceria, and combinations thereof.

In certain embodiments, the canister system comprises activated carbon derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

In any of the embodiments described herein, the form of adsorbent in the initial adsorbent volume, the subsequent adsorbent volume, or both consists of a member selected from the group consisting of granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, hollow-cylinder, star, twisted spiral, asterisk, configured ribbons, and combinations thereof. In certain additional embodiments, the canister systems as described herein comprise a subsequent adsorbent volume having a matrix with approximately uniform cell or geometric structure, e.g., a honeycomb configuration, which permits or facilitates approximately uniform air or vapor flow distribution through the subsequent adsorbent volume. In certain embodiments, the system comprises one or more subsequent adsorbent volumes having a uniform cell structure at or near the end of the fuel vapor flow path.

In any of the embodiments described herein the initial or subsequent adsorbent volume includes a volumetric diluent. Exemplary adsorbent volumetric diluents include inert spacer particles, trapped air spaces, foams, fibers, screens, and combinations thereof. In certain embodiments, the volumetric diluent includes an adsorbent material formed into a high voidage shape selected from the group consisting of stars, hollow tubes, asterisks, spirals, cylinders, configured ribbons, honeycombs, monoliths, and combinations thereof.

In any of the embodiments described herein, the evaporative emission control system may further comprise a heating unit.

In an additional aspect, the description provides methods for reducing fuel vapor emissions in an evaporative emission control system, the method comprising contacting the fuel vapor with an evaporative emission control system as described herein.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages objects and embodiments are expressly included within the scope of the present invention. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which:

FIGS. 9-22 are simplified schematic drawings of the evaporative emission control canister systems according to some non-limiting embodiments of present disclosure.

DESCRIPTION

Figure 1:
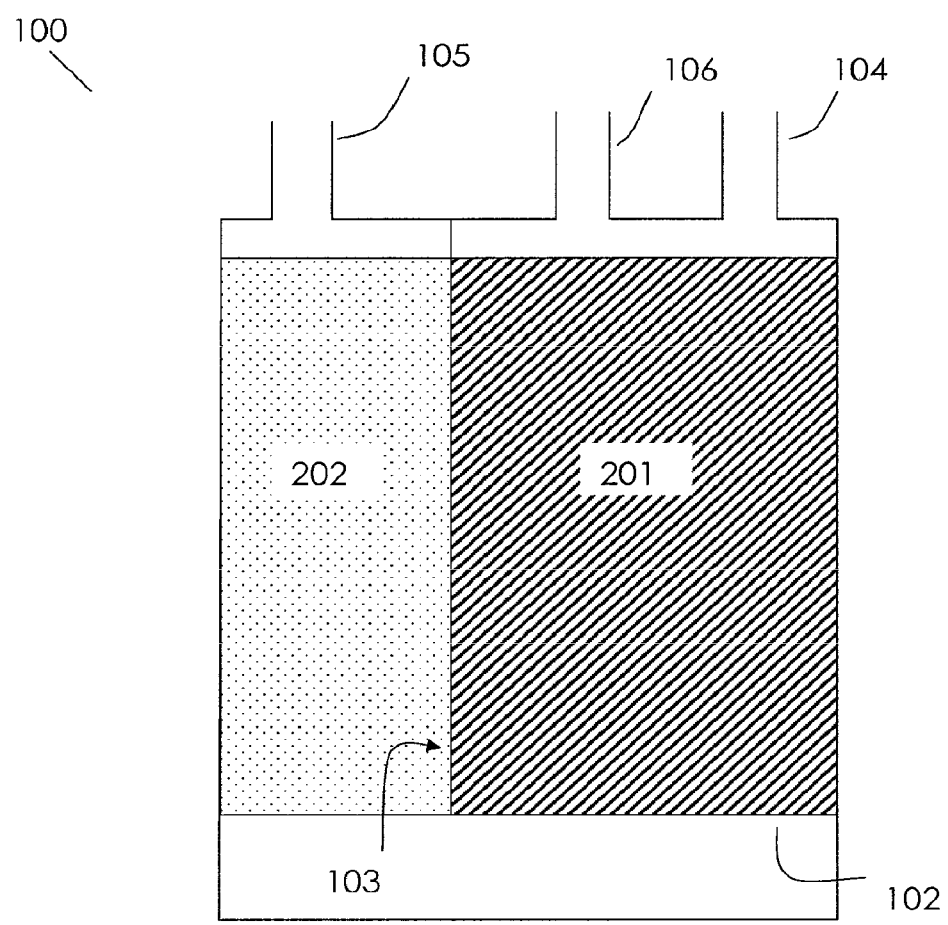
FIG. 1 is a cross-sectional view of the evaporative emission control canister system according to one embodiment of the disclosure, wherein the canister system has one canister.

The present disclosure now will be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Elements common between figures may retain the same numerical designation.

Where a range of values is provided, it is understood that each intervening value between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

As used herein, the terms "gaseous" and "vaporous" are used in a general sense and, unless the context indicates otherwise, are intended to be interchangeable.

The disclosed evaporative emission control systems provide low diurnal breathing loss (DBL) emissions even under a low purge condition. The evaporative emission performance of the disclosed evaporative emission control systems may be within the regulation limits defined by the California Bleed Emissions Test Procedure (BETP), which is 20 mg or less, even under a low purge condition. The term "low purge," as used herein, refers to a purge level at or below 210 liters applied after the 40 g/hr BETP butane loading step (i.e., 100 bed volumes for a 2.1 liter adsorbent component system).

Presently described are evaporative fuel emission control systems that are surprisingly and unexpectedly able to reduce DBL emissions to below 20 mg using relatively low purge volumes as determined using BETP. In general, the evaporative emission control systems as described herein include one or more canisters comprising an initial adsorbent volume connected to or in communication (e.g., vaporous or gaseous) with at least one subsequent adsorbent volume forming a vapor flow path therethrough, and wherein a "step-down" gradient in adsorption capacity exists as vapor flows or diffuses from the initial adsorbent volume towards the one or more subsequent adsorbent volumes. Conversely, the canister system creates a "step-up" gradient as air flows inward from the vent port to the one or more subsequent adsorbent volumes towards the initial adsorbent volume. Thus, in certain embodiments, the canister system permits the sequential contact of adsorbent volumes by air and vapor. In addition, the description provides methods of making and using the same.

As such, in one aspect the description provides an evaporative emissions control system including one or more canisters and comprising an initial adsorbent volume having an effective incremental adsorption capacity at 25° C. of greater than about 35 grams n-butane/L between vapor concentration of 5 vol % and 50 vol % n-butane; and at least one subsequent adsorbent volume having an effective incremental adsorption capacity at 25° C. of less than about 35 grams n-butane/L between vapor concentration of 5 vol % and 50 vol % n-butane, wherein the initial and subsequent adsorbent volumes are in communication, and wherein the canister system has a two-day diurnal breathing loss (DBL) emissions of no more than 20 mg at no more than about 210 liters of purge applied after a 40 g/hr BETP butane loading step.

In certain embodiments, the initial adsorbent volume and subsequent adsorbent volume (or volumes) are in vaporous or gaseous communication and define an air and vapor flow path therethrough. The air and vapor flow path permits or facilitates directional air or vapor flow or diffusion between the respective adsorbent volumes in the canister system. For example, the air and vapor flow path facilitates the flow or diffusion of fuel vapor from the initial adsorbent volume to the subsequent adsorbent volume (or volumes).

In certain embodiments, the subsequent adsorbent volume is configured to exhibit at least one of: (i) an approximately uniform structure that facilitates uniform air and vapor flow distribution across its flow path cross section, (ii) an effective butane working capacity (BWC) of less than about 3 g/dL and a g-total BWC of from about 2 to about 6 grams, or (iii) a combination thereof. As such, the subsequent adsorbent volume (or volumes) contribute to the formation of a canister system that has a two-day diurnal breathing loss (DBL) emissions of no more than 20 mg at no more than about 210 liters of purge applied after a 40 g/hr BETP butane loading step. In certain embodiments, the canister system comprises a plurality of subsequent adsorbent volumes, e.g., connected in series with the initial adsorbent volume, each of the subsequent adsorbent volumes, independently of the others, being configured to exhibit at least one of: (i) an approximately uniform structure that facilitates uniform air and vapor flow distribution across its flow path cross section, (ii) an effective butane working capacity (BWC) of less than about 3 g/dL and a g-total BWC of from about 2 to about 6 grams, or (iii) a combination thereof.

In any of the embodiments described herein, the initial adsorbent volume and subsequent adsorbent volume(s) may be located within a single canister, separate canisters or a combination of both. For example, in certain embodiments, the system comprises a canister comprising an initial adsorbent volume, and one or more subsequent adsorbent volumes, wherein the subsequent adsorbent volumes are connected to the initial adsorbent volume such that they are in vaporous or gaseous communication forming a vapor flow path, and allowing air and/or vapor to flow or diffuse therethrough. In certain aspects, the canister permits sequential contact of the adsorbent volumes by air or fuel vapor.

In additional embodiments, the system comprises a canister comprising an initial adsorbent volume, and one or more subsequent adsorbent volumes connected to one or more separate canisters comprising at least one additional subsequent adsorbent volume, wherein the subsequent adsorbent volumes are connected to the initial adsorbent volume such that they are in vaporous or gaseous communication forming a vapor flow path, and allowing air and/or fuel vapor to flow or diffuse therethrough.

In certain embodiments, the canister system has a two-day diurnal breathing loss (DBL) emissions of no more than 20 mg at no more than about 100 bed volume of purge applied after the 40 g/hr BETP butane loading step.

In certain embodiments, the canister system comprises one or more subsequent adsorbent volumes that are configured to have or exhibit a structure that facilitates an approximately uniform air and vapor flow distribution through the adsorbent volume. Without being bound by any particular theory, it is believed that the uniform air and vapor flow distribution improves the efficiency of the canister system. In particular, it appears that having a subsequent adsorbent volume configured to facilitate approximately uniform air and vapor flow distribution therethrough at or near the terminus of the vapor flow path (i.e., near the vent port to the atmosphere) improves the performance of the canister system. As such, in certain embodiments, the canister system comprises one or more subsequent adsorbent volumes, which are configured to have or exhibit an approximately uniform structure that facilitates approximately uniform air and vapor flow distribution therethrough, at or near the terminus of the fuel vapor flow path or at or near the opening to the vent port.

In certain embodiments, the subsequent adsorbent volume, which is configured to facilitate approximately uniform air and vapor flow distribution therethrough comprises a porosity, voidage, or cell structure that provides for approximately uniform air and vapor flow distribution across its cross-section (i.e., the plane perpendicular to the flow path). In a preferred embodiment, the subsequent adsorbent volume comprises a matrix of cells of approximately uniform dimension (e.g., size, shape, or combination thereof), distribution or both. In certain embodiments, the subsequent adsorbent volume includes a grid or honeycomb of cells of approximately uniform dimension and distribution. In still another embodiment, the subsequent adsorbent volume is a square grid having cells of approximately uniform dimension and distribution. In additional embodiments, the subsequent adsorbent volume has an effective butane working capacity (BWC) of less than 3 g/dL, and a g-total BWC of between 2 grams and 6 grams.

In another embodiment, for example, where the subsequent adsorbent volume is not configured for approximately uniform air and vapor flow distribution across its cross-section, such as from a square cell grid in a cylindrical-shaped monolith adsorbent, the evaporative emission control canister system comprises an initial adsorbent volume having an effective incremental adsorption capacity at 25° C. of greater than 35 grams n-butane/L between vapor concentration of 5 vol % and 50 vol % n-butane; and at least one subsequent adsorbent volume having an effective incremental adsorption capacity at 25° C. of less than 35 grams n-butane/L between vapor concentration of 5 vol % and 50 vol % n-butane and an effective butane working capacity (BWC) of less than 3 g/dL, and a g-total BWC of between 2 grams and 6 grams. In any of the embodiments described herein, the initial adsorbent volume and subsequent adsorbent volume(s) may be located within a single canister, separate canisters or a combination of both. For example, in certain embodiments, the system comprises a canister comprising an initial adsorbent volume, and one or more subsequent adsorbent volumes, wherein the subsequent adsorbent volumes are connected to the initial adsorbent volume to allow sequential contact by fuel vapor. In additional embodiments, the system comprises a canister comprising an initial adsorbent volume, and one or more subsequent adsorbent volumes connected to one or more separate canisters comprising at least one additional subsequent adsorbent volume, wherein the subsequent adsorbent volumes are connected to the initial adsorbent volume to allow sequential contact by fuel vapor.

In certain embodiments, the evaporative emission control systems provide low diurnal breathing loss (DBL) emissions even when being purged at or below 210 liters applied after the 40 g/hr BETP butane loading step. In some embodiments, the evaporative emission control system may be purged at or below 157.5 liters applied after the 40 g/hr BETP butane loading step.

In additional embodiments, the evaporative emission control systems provide low diurnal breathing loss (DBL) emissions even when being purged at or below 100 BV (bed volumes based on a 2.1 liter nominal volume of the canister system) applied after the 40 g/hr BETP butane loading step. In some embodiments, the evaporative emission control systems may be purged at or below 75 BV (based on a 2.1 liter nominal volume of the canister system) applied after the 40 g/hr BETP butane loading step.

In certain embodiments, the canister system comprises a single subsequent adsorbent volume. In additional embodiments, the canister system comprises multiple subsequent adsorbent volumes. In still additional embodiments, the canister system comprises multiple subsequent adsorbent volumes, wherein each has an effective incremental adsorption capacity at 25° C. independently selected from the range of less than about 35 grams n-butane/L between vapor concentration of 5 vol % and 50 vol % n-butane.

Figure 2:
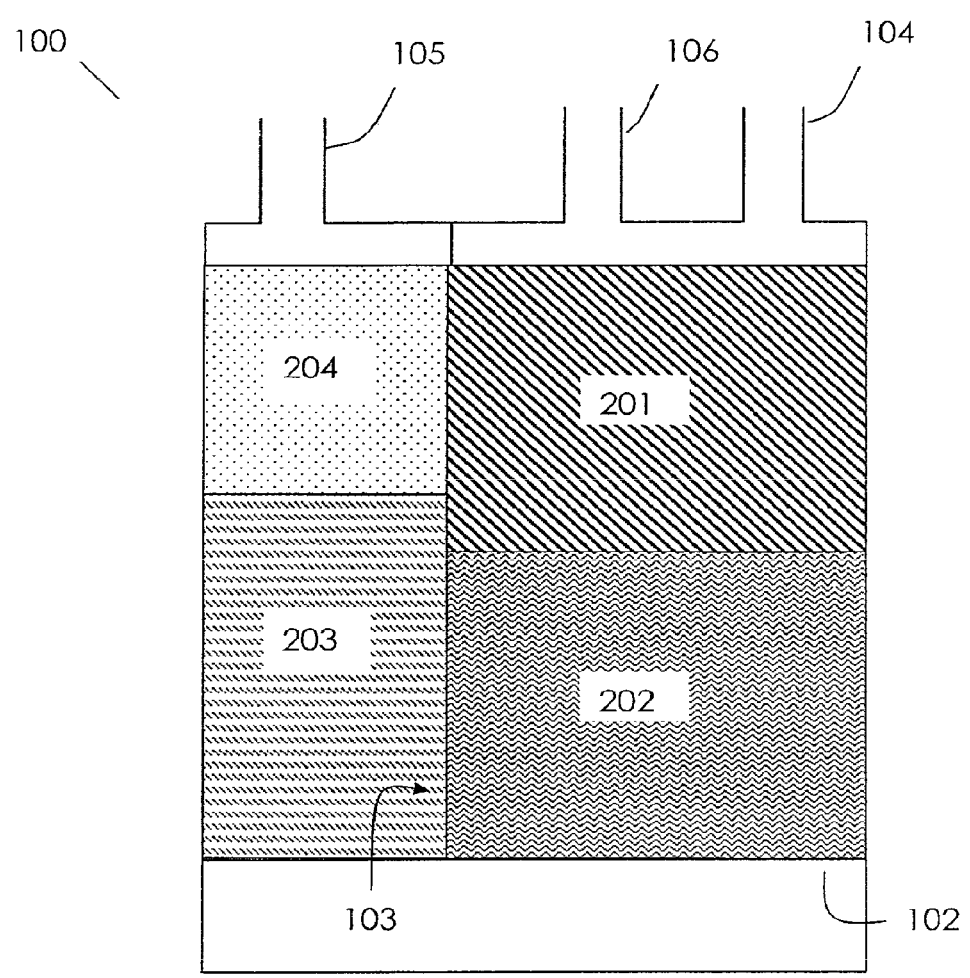
FIG. 2 is a cross-sectional view of the evaporative emission control canister system according to one embodiment of the disclosure, wherein the canister system has one canister.
Figure 3:
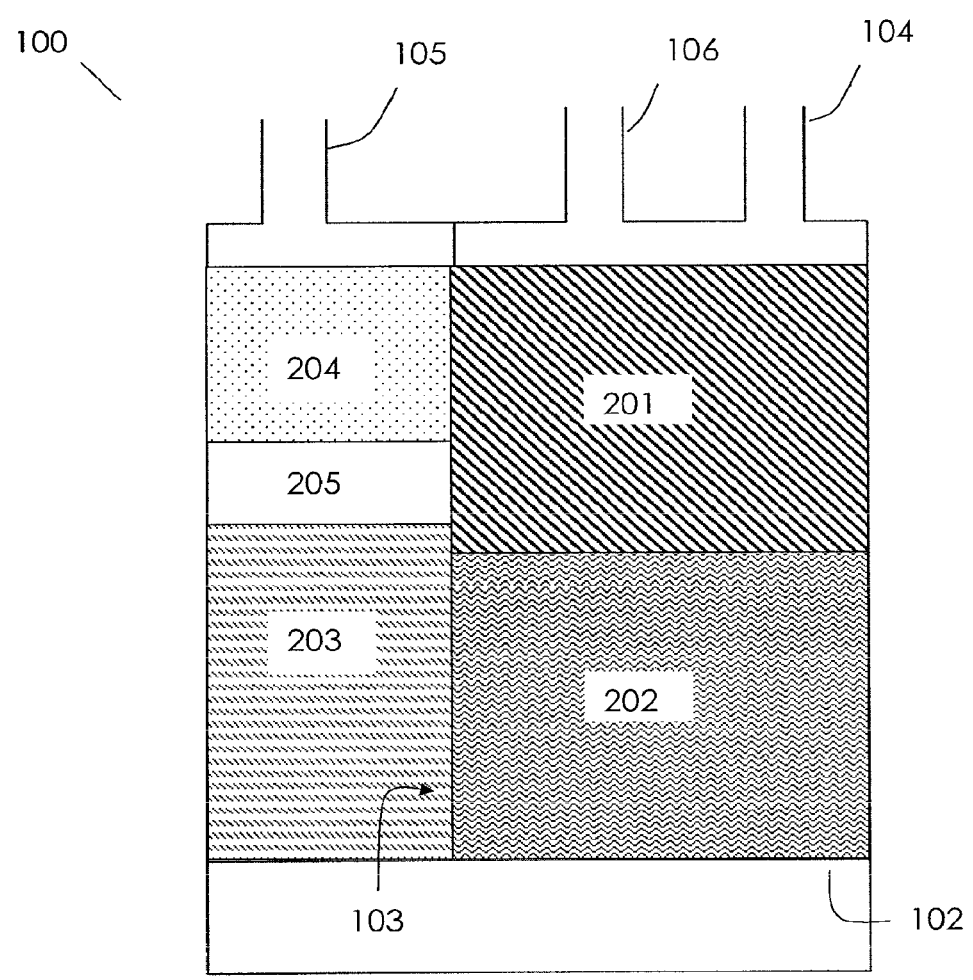
FIG. 3 is a cross-sectional view of the evaporative emission control canister system according to one embodiment of the disclosure, wherein the canister system has one canister.

FIGS. 1-3 show non-limiting examples of some embodiments of the evaporative emission control canister system wherein an initial adsorbent volume and subsequent adsorbent volume(s) are located within a single canister. FIGS. 4-7 show non-limiting examples of the embodiments of the evaporative emission control canister system that includes more than one canister, wherein an initial adsorbent volume and at least one subsequent adsorbent volume are located in separate canisters that are connected to permit sequential contact by fuel vapor.

FIG. 1 illustrates one embodiment of the evaporative emission control canister system having an initial adsorbent volume and a subsequent adsorbent volume within a single canister. Canister system 100 includes a support screen 102, a dividing wall 103, a fuel vapor inlet 104 from a fuel tank, a vent port 105 opening to an atmosphere, a purge outlet 106 to an engine, an initial adsorbent volume 201, and a subsequent adsorbent volume 202. When an engine is off, the fuel vapor from a fuel tank enters the canister system 100 through the fuel vapor inlet 104. The fuel vapor diffuses into the initial adsorbent volume 201, and then the subsequent adsorbent volume 202, which together define an air and vapor flow path, before being released to the atmosphere through the vent port 105 of the canister system. Once the engine is turned on, ambient air is drawn into the canister system 100 through the vent port 105. The purge air flows through the subsequent adsorbent volume 202 and then the initial adsorbent volume 201, and desorbs the fuel vapor adsorbed on the adsorbent volumes 202, 201 before entering an internal combustion engine through the purge outlet 106. In any of the embodiments of the he evaporative emission control canister system described herein, the canister system may include more than one subsequent adsorbent volume. In still additional embodiments, the canister system may include more than one of each type of subsequent adsorbent volume, which can be independently selected, and/or which is comprised in one or more containers. Stated differently, in any of the embodiments described herein, the canister system may comprise one or more subsequent adsorbent volumes in which each subsequent adsorbent volume, independently of the others, is configured to have or exhibit at least one of (i) an approximately uniform structure that facilitates an approximately uniform air and vapor flow distribution across its flow path cross section, (ii) has an effective butane working capacity (BWC) of less than about 3 g/dL and a g-total BWC of from about 2 to about 6 grams, or (ii) is a combination of (i) and (ii).

By way of non-limiting example, as depicted in FIG. 2, the evaporative emission control canister system 100 may include an initial adsorbent volume 201 and three subsequent adsorbent volumes 202, 203, 204 within a single canister, as illustrated in FIG. 2. Each of subsequent adsorbent volumes, e.g., 202, 203, 204, may be configured to facilitate an approximately uniform air and vapor flow distribution across its flow path cross section, has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105. Additionally, in certain embodiments, the evaporative emission control canister system may include an empty volume within the canister. As used herein, the term "empty volume" refers to a volume not including any adsorbent. Such volume may comprise any non-adsorbent including, but not limited to, air gap, foam spacer, screen, or combinations thereof. In a non-limiting example shown in FIG. 3, the evaporative emission control canister system 100 may include an initial adsorbent volume 201; three subsequent adsorbent volumes 202, 203, 204 within a single canister; and an empty volume 205 between the subsequent adsorbent volumes 203 and 204. Each of subsequent adsorbent volumes, e.g., 202, 203, 204, may be configured to facilitate an approximately uniform air and vapor flow distribution across its flow path cross section, has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105.

Figure 4:
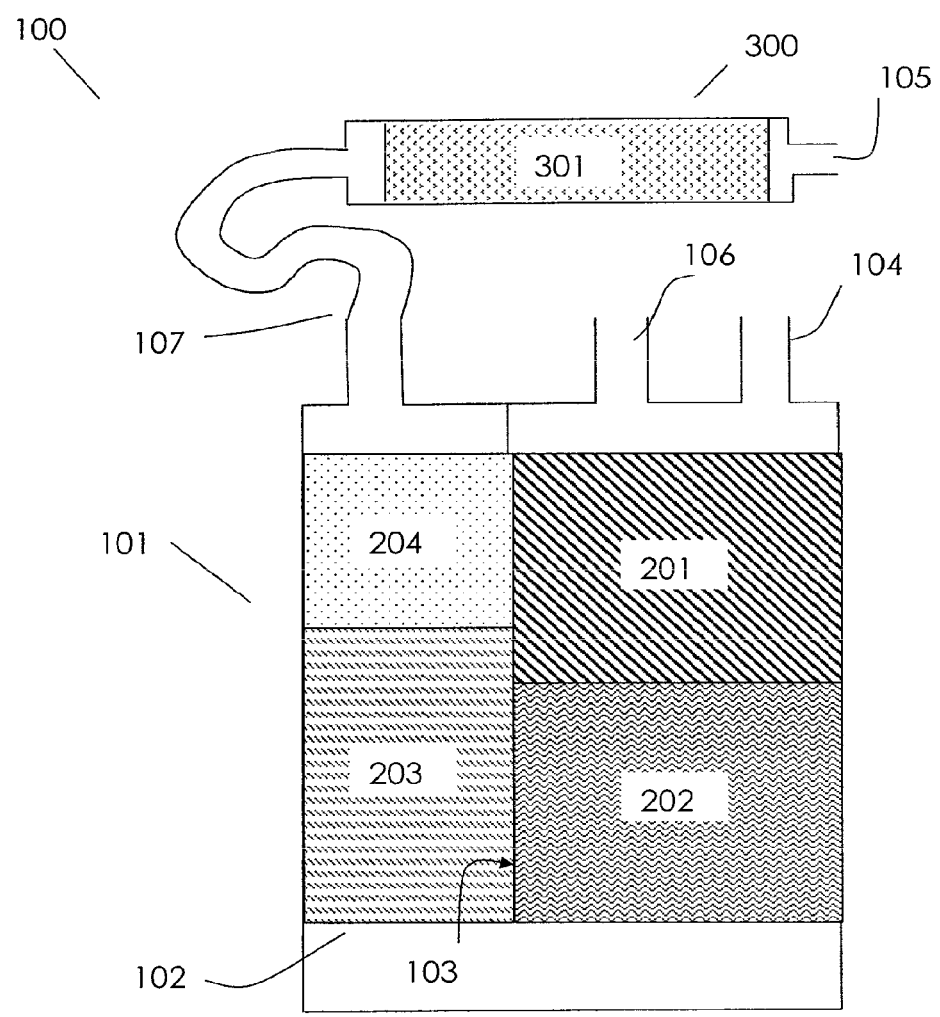
FIG. 4 is a cross-sectional view of the evaporative emission control canister system according to one embodiment of the disclosure, wherein the canister system has a main canister and a supplemental canister.

By way of non-limiting example, FIGS. 4-7 show the embodiments of the evaporative emission control canister system wherein the canister system includes more than one canister. As illustrated in FIG. 4, the canister system 100 includes a main canister 101, a support screen 102, a dividing wall 103, a fuel vapor inlet 104 from a fuel tank, a vent port 105 opening to an atmosphere, a purge outlet 106 to an engine, an initial adsorbent volume 201 in the main canister 101, subsequent adsorbent volumes 202, 203, 204 in the main canister 101, a supplemental canister 300 that includes a subsequent adsorbent volume 301, and a conduit 107 connecting the main canister 101 to the supplemental canister 300. Each of subsequent adsorbent volumes, e.g., 202, 203, 204, 301, may be configured to facilitate an approximately uniform air and vapor flow distribution, has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105.

When the engine is off, the fuel vapor from a fuel tank enters the canister system 100 through the fuel vapor inlet 104 into the main canister 101. The fuel vapor diffuses through the initial adsorbent volume 201 and then the subsequent adsorbent volumes (202, 203, and 204) in the main canister 101 before entering the supplemental canister 300 via the conduit 107. The fuel vapor diffuses through the subsequent adsorbent volume 301 inside the supplemental canister 300 before being released to the atmosphere through the vent port 105 of the canister system. Once the engine is turned on, ambient air is drawn into the canister system 100 through the vent port 105. The purge air flows through the subsequent adsorbent volume 301 in the supplemental canister 300, the subsequent adsorbent volumes (204, 203, 202) in the main canister 101, and then the initial adsorbent volume 201 in the main canister 101, to desorb the fuel vapor adsorbed on the adsorbent volumes (301, 204, 203, 202, 201) before entering the internal combustion engine through the purge outlet 106.

Figure 5:
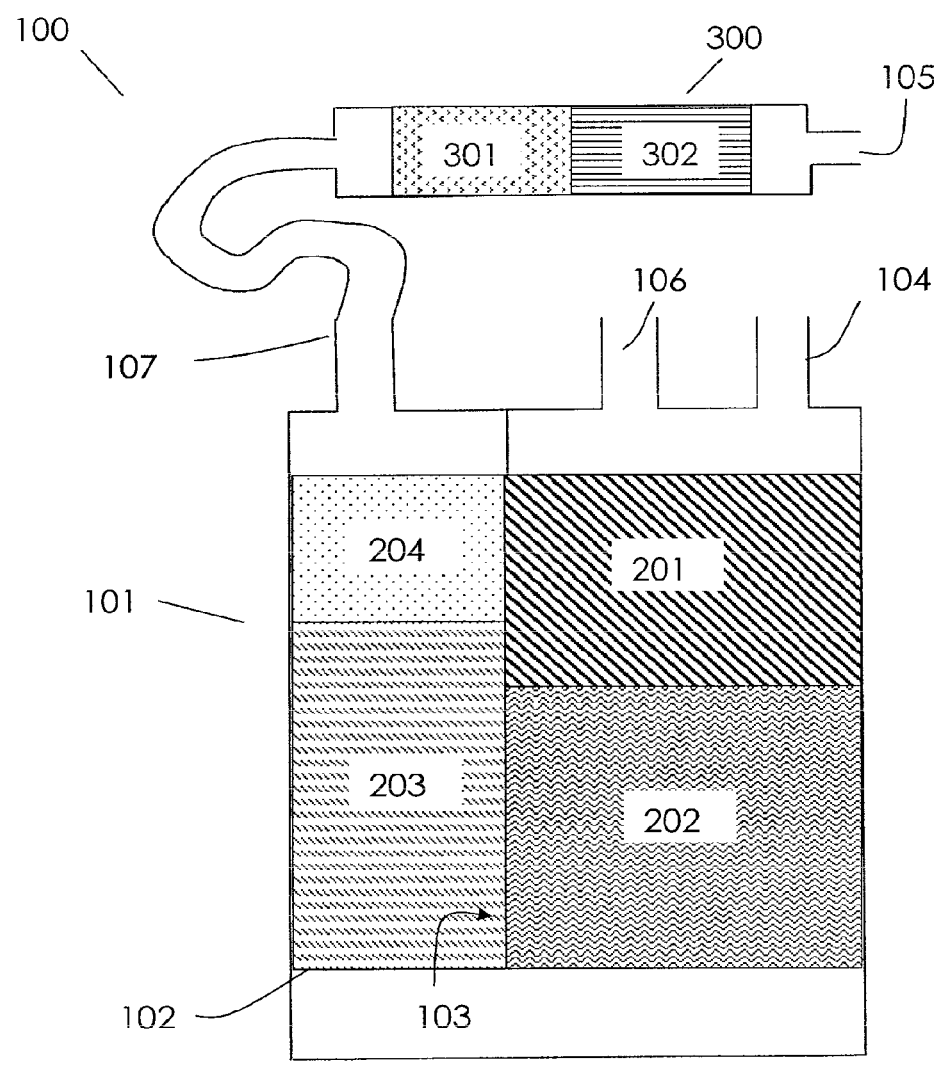
FIG. 5 is a cross-sectional view of the evaporative emission control canister system according to one embodiment of the disclosure, wherein the canister system has a main canister and a supplemental canister.

Similar to the main canister, the supplemental canister of the evaporative emission control canister system may include more than one subsequent adsorbent volume. By way of non-limiting example, the supplemental canister 300 of the evaporative emission control canister system 100 may include subsequent adsorbent volumes 301 and 302, as illustrated in FIG. 5. Each of subsequent adsorbent volumes, e.g., 202, 203, 204, 301, 302, may be configured to facilitate an approximately uniform air and vapor flow distribution, has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105.

Figure 6:
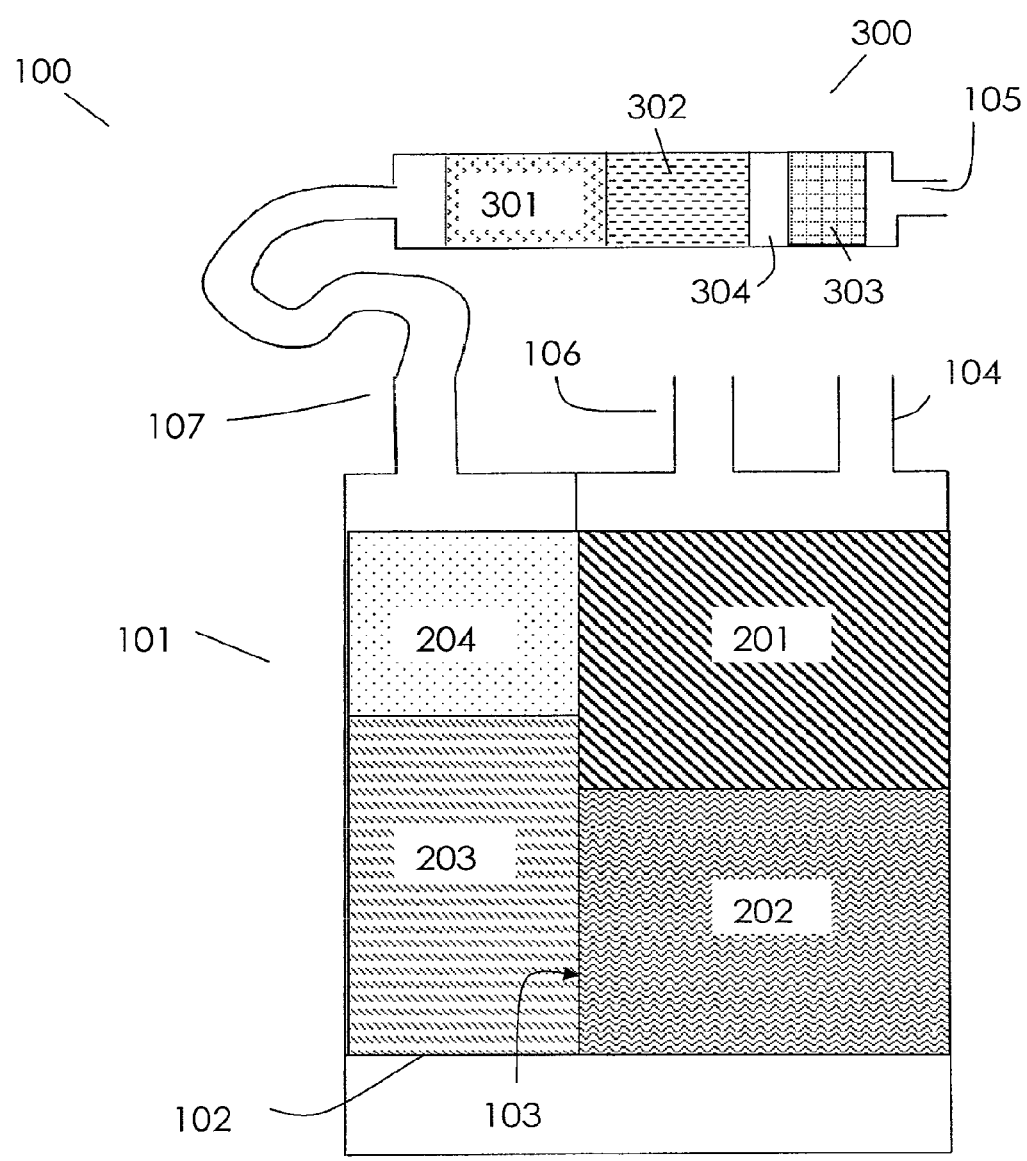
FIG. 6 is a cross-sectional view of the evaporative emission control canister system according to one embodiment of the disclosure, wherein the canister system has a main canister and a supplemental canister.

Furthermore, the supplemental canister of the evaporative emission control canister system may include an empty volume between the subsequent adsorbent volumes. By way of non-limiting example, the supplemental canister 300 of the evaporative emission control canister system 100 may include subsequent adsorbent volumes (301, 302, and 303) and an empty volume 304 between the subsequent adsorbent volumes 302 and 303 as illustrated in FIG. 6. Each of subsequent adsorbent volumes, e.g., 202, 203, 204, 301, 302, 303, may be configured to facilitate an approximately uniform air and vapor flow distribution, has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105.

Figure 7:
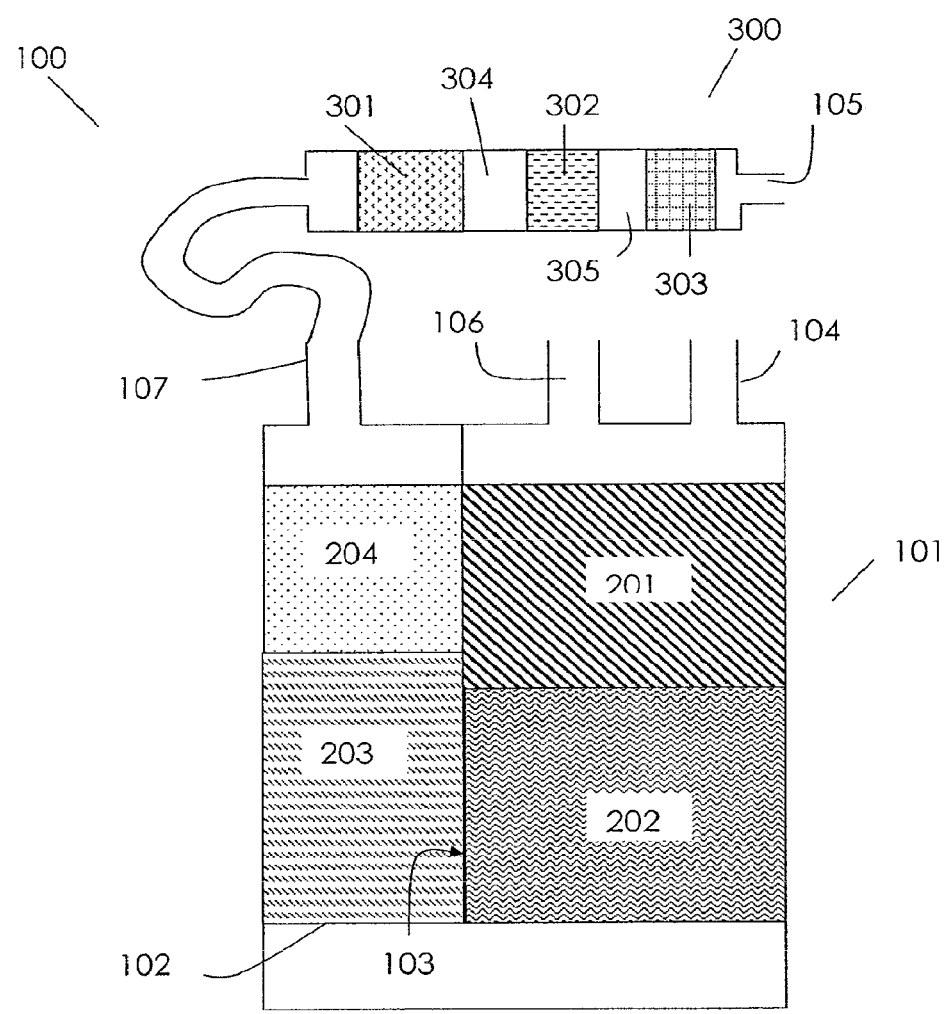
FIG. 7 is a cross-sectional view of the evaporative emission control canister system according to one embodiment of the disclosure, wherein the canister system has a main canister and a supplemental canister.

In a non-limiting example shown in FIG. 7, the supplemental canister 300 of the evaporative emission control canister system 100 may include subsequent adsorbent volumes (301, 302, 303), an empty volumes 304 between the subsequent adsorbent volumes 301 and 302, and an empty volumes 305 between the subsequent adsorbent volumes 302 and 303. As previously discussed, the term "empty volume" refers to a volume not including any adsorbent. Such volume may comprise any non-adsorbent including, but not limited to, air gap, foam spacer, screen, conduit, or combinations thereof. Each of subsequent adsorbent volumes, e.g., 202, 203, 204, 301, 302, 303, may be configured to facilitate an approximately uniform air and vapor flow distribution has an effective butane working capacity (BWC) of less than about 3 g/dL and a g-total BWC of from about 2 to about 6 grams, or a combination thereof. In a preferred embodiment, the canister system comprises at least one subsequent adsorbent volume configured to facilitate an approximately uniform air and vapor flow distribution located at or near the vent port 105.

Additionally, the evaporative emission control canister system may include an empty volume between the main canister and the supplemental canister.

When desired, the evaporative emission control canister system may include more than one supplemental canister. The evaporative emission control canister system may further include one or more empty volumes between the main canister and a first supplemental canister, between the supplement canisters, and/or at the end of the last supplemental canister. By way of non-limiting example, the evaporative emission control canister system may include a main canister, a first supplemental canister, a second supplemental canister, a third supplemental canister, an empty volume between the main canister and a first supplemental canister, an empty volume between the first and second supplemental canister, and an empty volume at the end of the third supplemental canister.

As discussed above, FIGS. 1-7 are merely exemplary embodiments of the disclosed evaporative emission control canister system, and those skilled in the art may envision additional embodiments without departing from the scope of the present disclosure.

When desired, the total adsorbent volume (i.e., the sum of the initial adsorbent volume and the subsequent adsorbent volumes) may be the same as the volume of the evaporative emission control canister system. Alternatively, the total adsorbent volume may be less than the volume of the evaporative emission control canister system.

In an additional aspect, the description provides methods for reducing fuel vapor emissions in an evaporative emission control system, the method comprising contacting the fuel vapor with an evaporative emission control system as described herein In a particular embodiment, a method of reducing fuel vapor emissions in an evaporative emission control system comprises contacting the fuel vapor with an initial adsorbent volume having an effective incremental adsorption capacity at 25° C. of greater than 35 grams n-butane/L between vapor concentration of 5 vol % and 50 vol % n-butane, and at least one subsequent adsorbent volume having an effective incremental adsorption capacity at 25° C. of less than about 35 grams n-butane/L between vapor concentration of 5 vol % and 50 vol % n-butane, wherein the initial and subsequent adsorbent volumes are in gaseous or vaporous communication, wherein the subsequent adsorbent volume is configured to have or exhibit at least one of: (i) an approximately uniform air and vapor flow distribution across its flow path cross section, (ii) an effective butane working capacity (BWC) of less than about 3 g/dL and a g-total BWC of from about 2 to about 6 grams, or (iii) a combination thereof; wherein the canister system has a two-day diurnal breathing loss (DBL) emissions of no more than 20 mg at no more than about 210 liters of purge applied after a 40 g/hr BETP butane loading step. In certain embodiments, the approximately uniform air and vapor flow distribution is facilitated by a subsequent adsorbent volume comprising an approximately uniform structure.

The term "adsorbent component" or "adsorbent volume," as used herein, refers to an adsorbent material or adsorbent containing material along vapor flow path, and may consist of a bed of particulate material, a monolith, honeycomb, adsorbent foam, sheet or other material.

The term "nominal volume," as used herein, refers to a sum of the volumes of the adsorbent components, and does not include the volumes of gaps, voids, ducts, conduits, tubing, plenum spaces or other volumes along lengths of the vapor flow path that are devoid of adsorbent material across the plane perpendicular to vapor flow path. For example, in FIG. 1 the total nominal volume of the canister system is the sum of the volumes of adsorbent volumes 201 and 202. For example, in FIGS. 2 and 3, the total nominal volume of the canister system is the sum of the volumes of adsorbent volumes 201, 202, 203, and 204. In FIG. 4, the total nominal volume of the canister system is the sum of the volumes of adsorbent volumes 201, 202, 203, 204, and 301. In FIG. 5, the total nominal volume of the canister system is the sum of the volumes of adsorbent volumes 201, 202, 203, 204, 301, and 302. In FIGS. 6 and 7, the total nominal volume of the canister system is the sum of the volumes of adsorbent volumes 201, 202, 203, 204, 301, 302, and 303.

Determination of Nominal Volume Apparent Density

The term "nominal volume apparent density," as used herein, is the mass of the representative adsorbent in the adsorbent volume divided by the nominal volume of adsorbent, where the length of the volume is defined as the the in situ distance within the canister system between the perpendicular plane of the vapor flow path initially in contact with the adsorbent component and the perpendicular plan of the vapor flow path exiting the adsorbent component.

Non-limiting examples of how to calculate the nominal volume apparent density for various forms of adsorbents are described herein.

(A) Granular, Pelletized, or Spherical Adsorbents of Uniform Adsorptive Capacity Across the Length of the Adsorbent Component Flow Path The standard method ASTM D 2854 (hereinafter "the Standard Method") may be used to determine the nominal volume apparent density of particulate adsorbents, such as granular and pelletized adsorbents of the size and shape typically used for evaporative emission control for fuel systems. The Standard Method may be used to determine the apparent density of adsorbent volume, when it provides the same apparent density value as the ratio of the mass and the nominal volume of the adsorbent bed found in the canister system. The mass of the adsorbent by the Standard Method is of the representative adsorbent used in the incremental adsorption analysis, i.e., equivalently including or excluding inert binders, fillers, and structural components within the adsorbent volume depending on what representative material is analyzed as the adsorbent sample.

Furthermore, the nominal volume apparent density of adsorbent volume may be determined using an alternative apparent density method, as defined below. The alternative method may be applied to nominal adsorbent volumes that have apparent densities that are not comparably or suitably measured by the Standard Method. Additionally, the alternative apparent density method may be applied to particulate adsorbents in lieu of the Standard Method, due to its universal applicability. The alternative method may be applied to the adsorbent volume that may contain particulate adsorbents, non-particulate adsorbents, and adsorbents of any form augmented by spacers, voids, voidage additives within a volume or sequential similar adsorbent volumes for the effect of net reduced incremental volumetric capacity.

In the alternative apparent density method, the apparent density of adsorbent volume is obtained by dividing the mass of adsorbent by the volume of adsorbent, wherein:

(1) the dry mass basis of the representative adsorbent in the adsorbent volume is measured. For example, a 0.200 g representative sample of the 25.0 g total adsorbent mass in an adsorbent volume is measured for adsorptive capacity by the McBain method. Whereas the McBain method yields an adsorption value of g-butane per g-adsorbent, the applicable mass is 25.0 g for the numerator in the apparent density of the adsorbent volume that then allows conversion of the McBain analytical value to the volumetric property of the adsorbent volume; and (2) the volume of the adsorbent component in the denominator of the apparent density is defined as the in situ geometric volume under which the superficial vapor flow path occurs within the canister system. The length of the volume is bounded by a plane perpendicular to the superficial vapor flow entrance of the adsorbent volume in question (i.e., the point at which there is adsorbent present on the perpendicular plane) and a plane perpendicular to the superficial flow at the vapor flow exit of the adsorbent volume in question (i.e., the point at which there is no adsorbent across the plane perpendicular to vapor flow).

(B) Honeycombs, Monolith, or Foam Adsorbents (1) Cylindrical Honeycomb Adsorbents The apparent density of cylindrical honeycomb absorbents may be determined according to the procedure of Purification Cellutions, LLC (Waynesboro, Ga.) SOP 500-115. The volume of adsorbent is a multiple of the cross-sectional area (A) and the length (h) of the adsorbent. The length (h) of the adsorbent is defined as the distance between the front plane of the adsorbent perpendicular to vapor or gas flow entering the adsorbent and the back plane of the adsorbent where the vapor or gas exits the adsorbent. The volume measurement is that of the nominal volume, which is also used for defining bed volume ratios for purge. In the case of a cylindrical honeycomb adsorbent of circular cross-section, the adsorbent cross-sectional area is determined by $\pi d^2/4$, where d is the average diameter measured at four points on each end of the honeycomb. The nominal adsorbent volume and the nominal volume apparent density are calculated as follows:

$$\text{Nominal Adsorbent Volume} = h \times A$$

$$\text{Nominal Volume Apparent Density} = \text{Part Mass}/(h \times A)$$

wherein "Part Mass" is the mass of the adsorbent for which a representative adsorbent sample was tested for adsorptive properties, including representative proportions of inert or adsorptive binders and fillers.

By way of non-limiting examples, FIG. 9 shows the boundary definitions for the nominal volume of a honeycomb adsorbent 109 having a cross-sectional area A. The vapor or gas flows through the honeycomb adsorbent 109 in the direction of D1 to D2. The vapor or gas enters the front plane (F) of the adsorbent 109, flows through the length (h) of the adsorbent 109, and exits back plane (B) of the adsorbent 109. The nominal volume of a honeycomb adsorbent 109 equals to the cross-sectional area A×the length h. Similarly, FIG. 10 shows the boundary definitions for the nominal volume of foam adsorbent 110.

(2) Pleated, Corrugated and Sheet Adsorbents

For pleated and corrugated adsorbents, the nominal adsorbent volume includes all the void space created by the pleats and corrugations. The volume measurement is that of the nominal volume, which is also used for defining bed volume ratios for purge. The nominal volume and the apparent density of adsorbent are calculated as follows:

$$\text{Nominal Adsorbent Volume} = h \times A$$

$$\text{Nominal Volume Apparent Density} = \text{Part Mass}/(h \times A)$$

wherein

"Part Mass" is the mass of the adsorbent for which a representative adsorbent sample was tested for adsorptive properties, including representative proportions of inert or adsorptive binders and fillers, h is the length of adsorbent, defined as the distance between the front plane of the adsorbent perpendicular to vapor or gas flow entering the filter and the back plane of the adsorbent where the vapor or gas exits the filter, and A is the cross-sectional area of adsorbent.

By way of non-limiting example, FIG. 11 shows the boundary definitions for the volume of a stacked corrugated sheet adsorbent monolith 111. It is also within those skilled in the art to form such a monolith as an extruded honeycomb.

In the case of a pleated adsorbent, the adsorbent cross-sectional area is determined by L×W, where L is the distance from one edge of the adsorbent to the opposite edge of the adsorbent in direction X, and W is the distance from one edge of the adsorbent to the opposite edge of the adsorbent in direction Y.

Figure 13:
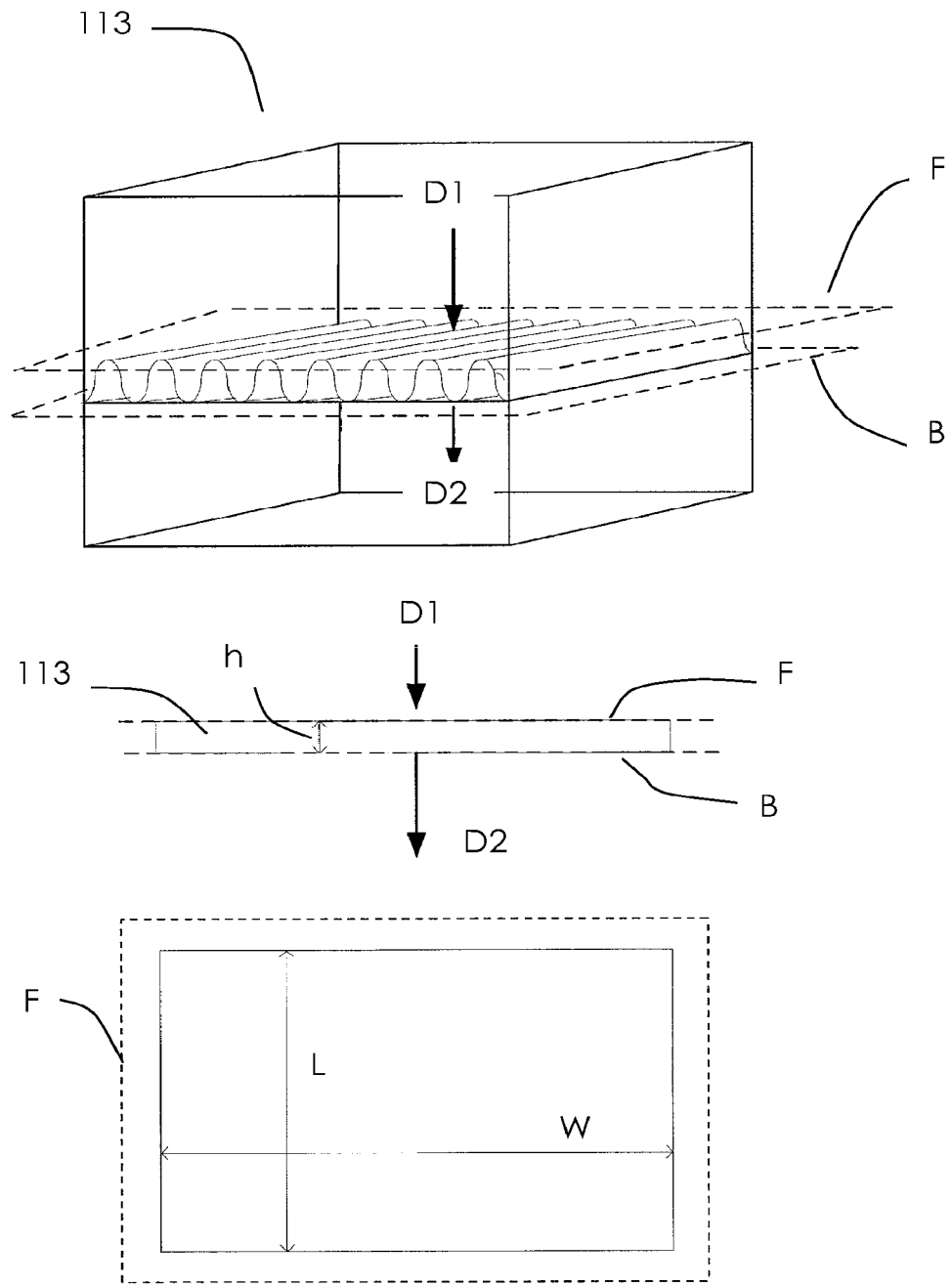
Figure 14:
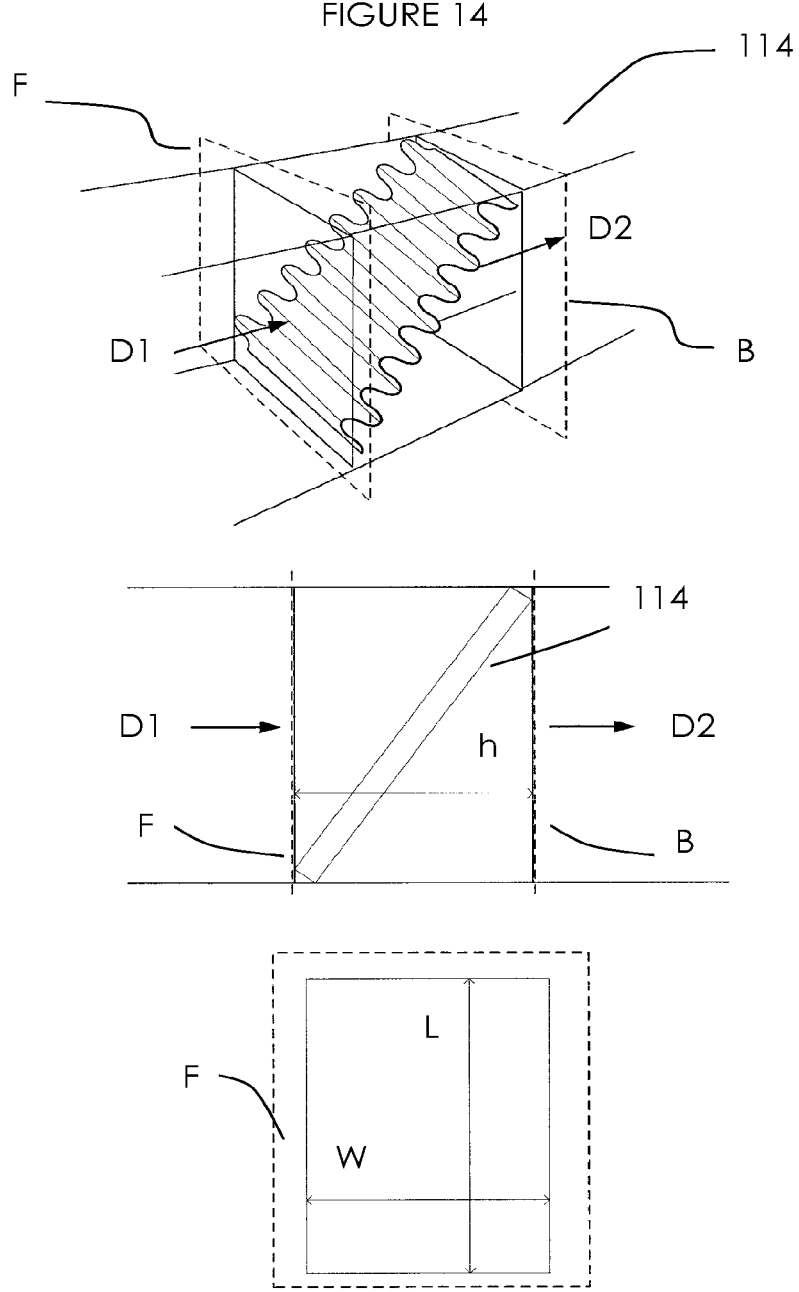
Figure 16:
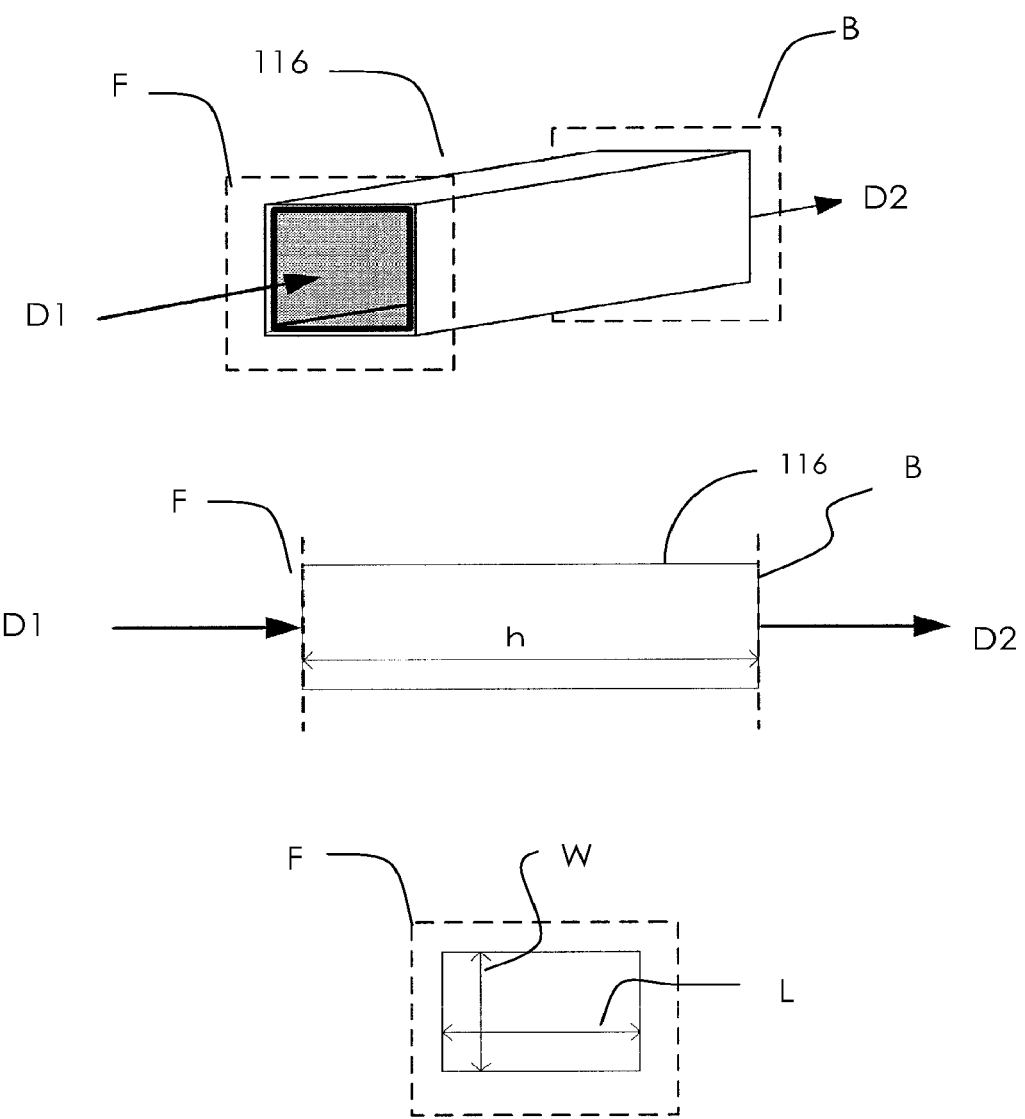

By way of non-limiting examples, FIG. 12 shows the boundary definitions for the volume of a single pleat or corrugation 112. FIG. 13 shows the boundary definitions for the volume of a pleated or corrugated sheet 113 with vapor flow path provided through the sheet by some form of permeability to gas flow. The face of the sheet is perpendicular to the vapor flow. In contrast, FIG. 14 shows the boundary definitions for the volume of a pleated or corrugated sheet 114 where its face is angled to gas flow. FIG. 15 shows the boundary definitions for the volume of an adsorbent volume 115 of parallel adsorbent sheets. FIG. 16 shows the boundary definitions for the volume of an adsorbent sleeve 116.

Determination of Nominal Incremental Adsorption Capacity

The term "nominal incremental adsorption capacity," as used herein, refers to an adsorption capacity according to the following equation:

Nominal Incremental Adsorption Capacity=[Adsorbed Butane at 50 vol %–Adsorbed Butane at 5 vol %]×Nominal Volume Apparent Density× 1000 wherein

"Adsorbed Butane at 50 vol %" is the gram mass of absorbed n-butane per gram mass of adsorbent sample at 50 vol % butane concentration;

"Adsorbed Butane at 5 vol %" is the gram mass of absorbed n-butane per gram mass of adsorbent sample at 5 vol % butane concentration; and "Nominal Volume Apparent Density" is as defined previously.

Determination of the Nominal Volume Butane Working Capacity (BWC)

The standard method ASTM D5228 may be used to determine the nominal volume butane working capacity (BWC) of the adsorbent volumes containing particulate granular and/or pelletized adsorbents.

A modified version of ASTM D5228 method may be used to determine the nominal volume butane working capacity (BWC) of the honeycomb, monolith, and/or sheet adsorbent volumes. The modified method may also be used for particulate adsorbents, where the particulate adsorbents include fillers, voids, structural components, or additives. Furthermore, the modified method may be used where the particulate adsorbents are not compatible with the standard method ASTM D5228, e.g., a representative adsorbent sample may not be readily placed as the 16.7 mL fill in the sample tube of the test.

The modified version of ASTM D5228 method is as follows. The adsorbent sample is oven-dried for a minimum of eight hours at 110±5° C., and then placed in desiccators to cool down. The dry mass of the adsorbent sample is recorded. The mass of the empty testing assembly is determined before the adsorbent sample is assembled into a testing assembly. Then, the test assembly is installed into the a flow apparatus and loaded with n-butane gas for a minimum of 25 minutes (±0.2 min) at a butane flow rate of 500 ml/min at 25° C. and 1 atm pressure. The test assembly is then removed from the BWC test apparatus. The mass of the test assembly is measured and recorded to the nearest 0.001 grams. This n-butane loading step is repeated for successive 5 minutes flow intervals until constant mass is achieved. For example, the total butane load time for a 35 mm diameter× 150 mm long honeycomb (EXAMPLE 2 Adsorbent 1) was 66 minutes. The test assembly may be a holder for a honeycomb or monolith part, for the cases where the nominal volume may be removed and tested intact. Alternatively, the nominal volume may need to be a section of the canister system, or a suitable reconstruction of the nominal volume with the contents appropriately oriented to the gas flows, as otherwise encountered in the canister system.

The test assembly is reinstalled to the test apparatus and purged with 2.00 liter/min air at 25° C. and 1 atm pressure for a set selected purge time (±0.2 min) according to the formula: Purge Time (min)=(719×Nominal Volume (cc))/ (2000 (cc/min)).

The direction of the air purge flow in the BWC test is in the same direction as the purge flow to be applied in the canister system. After the purge step, the test assembly is removed from the BWC test apparatus. The mass of the test assembly is measured and recorded to the nearest 0.001 grams within 15 minutes of test completion.

The nominal volume butane working capacity (BWC) of the adsorbent sample was determined using the following equation:

$$\text{Nominal Volume } BWC(g/dL) = \frac{\text{Amount of Butane Purged (g)}}{\text{Nominal Adsorbent Volume (dL)}}$$

wherein

"Nominal Volume Apparent Density" is as defined previously, and

Amount of Butane Purged=Mass of the test assembly after loading–Mass of the test assembly after purge.

The term "g-total BWC," as used herein, refers to g-amount of butane purged.

Determination of Effective Volumetric Properties

The effective volume of adsorbents takes into account the air gaps, voids and other volumes between the nominal volumes of adsorbents along the vapor flow path that lack adsorbent. Thus, the effective volumetric properties of adsorbent refer to the properties of the adsorbent that take into account air gaps, voids and other volumes between the nominal volumes of adsorbents that lack adsorbent along the vapor flow path.

The effective volume ($V_{eff}$) for a given length of the vapor flow path is the sum of the nominal volumes of adsorbent ($V_{nom,i}$) present along that vapor path length plus adsorbent-free volumes along that vapor flow path ($V_{gap,j}$).

$$V_{eff} = \Sigma V_{nom,i} + \Sigma V_{gap,j}$$

A volumetric adsorptive properties of an effective volume ($B_{eff}$), such as incremental adsorption capacity (g/L), apparent density (g/mL) and BWC (g/dL), is the sum of each property of the individual nominal volumes to be considered as part of the effective volume ($B_{nom,i}$) multiplied by each individual nominal volume ($V_{nom,i}$), then divided by the total effective volume ($V_{eff}$):

$$B_{eff} = \Sigma (B_{nom,i} \times V_{nom,i}) / V_{eff}$$

Thus, the term "effective incremental adsorption capacity" is the sum of each nominal incremental adsorption capacity multiplied by each individual nominal volume, and then divided by the total effective volume.

The term "effective butane working capacity (BWC)" is the sum of each BWC value multiplied by each individual nominal volume, and then divided by the total effective volume.

The term "effective apparent density" is the sum of each apparent density multiplied by each individual nominal volume, and then divided by the total effective volume The term "g-total BWC of the effective volume" is the sum of the g-total BWC gram values of the nominal volumes within the effective volume.

Figure 17:
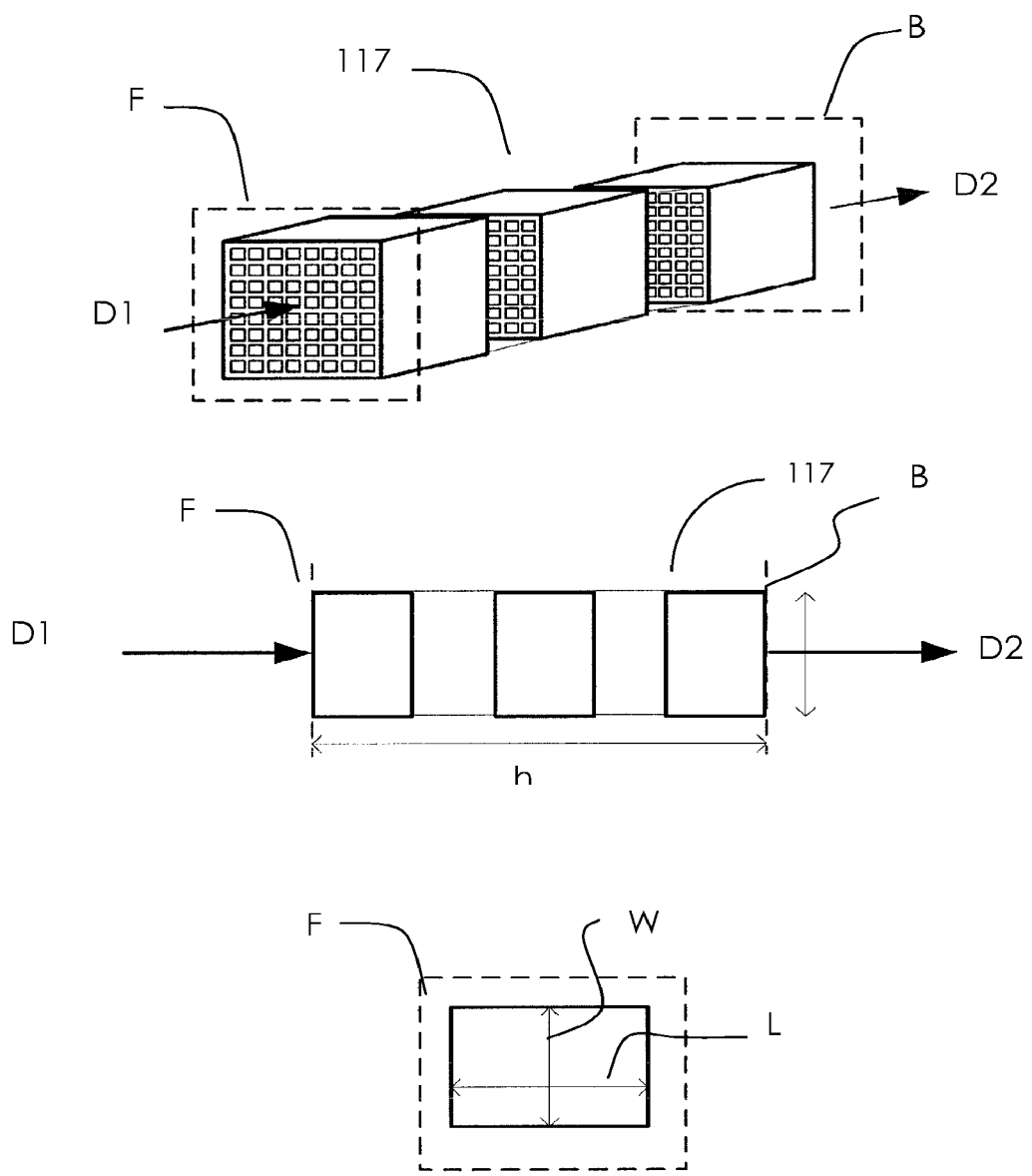
Figure 18:
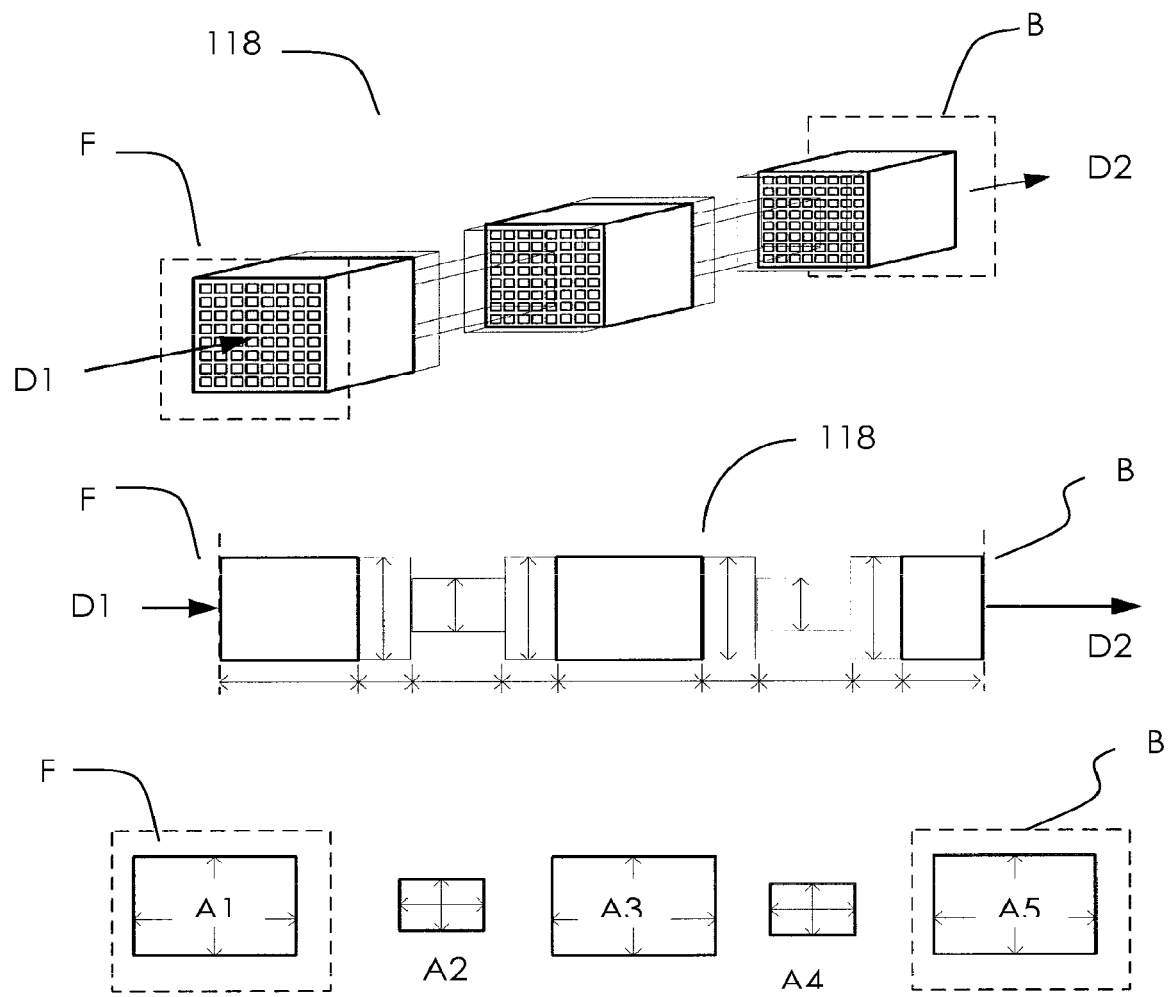

As non-limiting examples of how to determine effective volume of adsorbents, FIG. 17 shows the effective volume for three adsorbent honeycomb nominal volumes connected in the flow path by gaps of equal cross-sectional areas, with the arrow in the direction of D1 to D2 indicating vapor flow into the effective volume, towards the canister system vent. FIG. 18 shows three adsorbent honeycomb nominal volumes connected by conduit sections of different cross-sectional areas compared with the honeycomb cross-sectional areas. In FIGS. 17 and 18, the honeycomb nominal volumes and the gaps appear symmetric. However, it is understood that the honeycomb nominal volumes and the gaps may have different dimensions.

Figure 19:
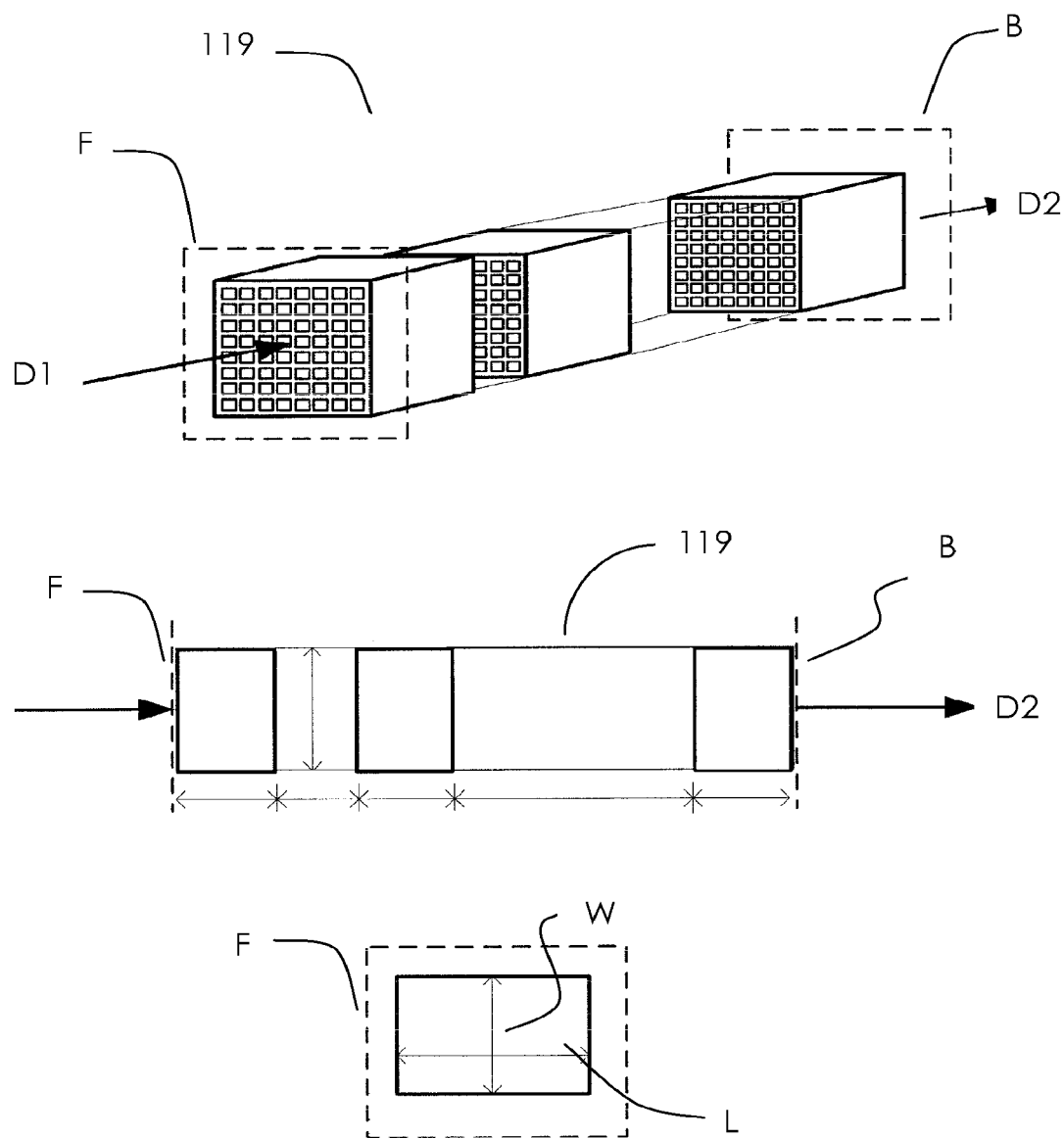
Figure 21:
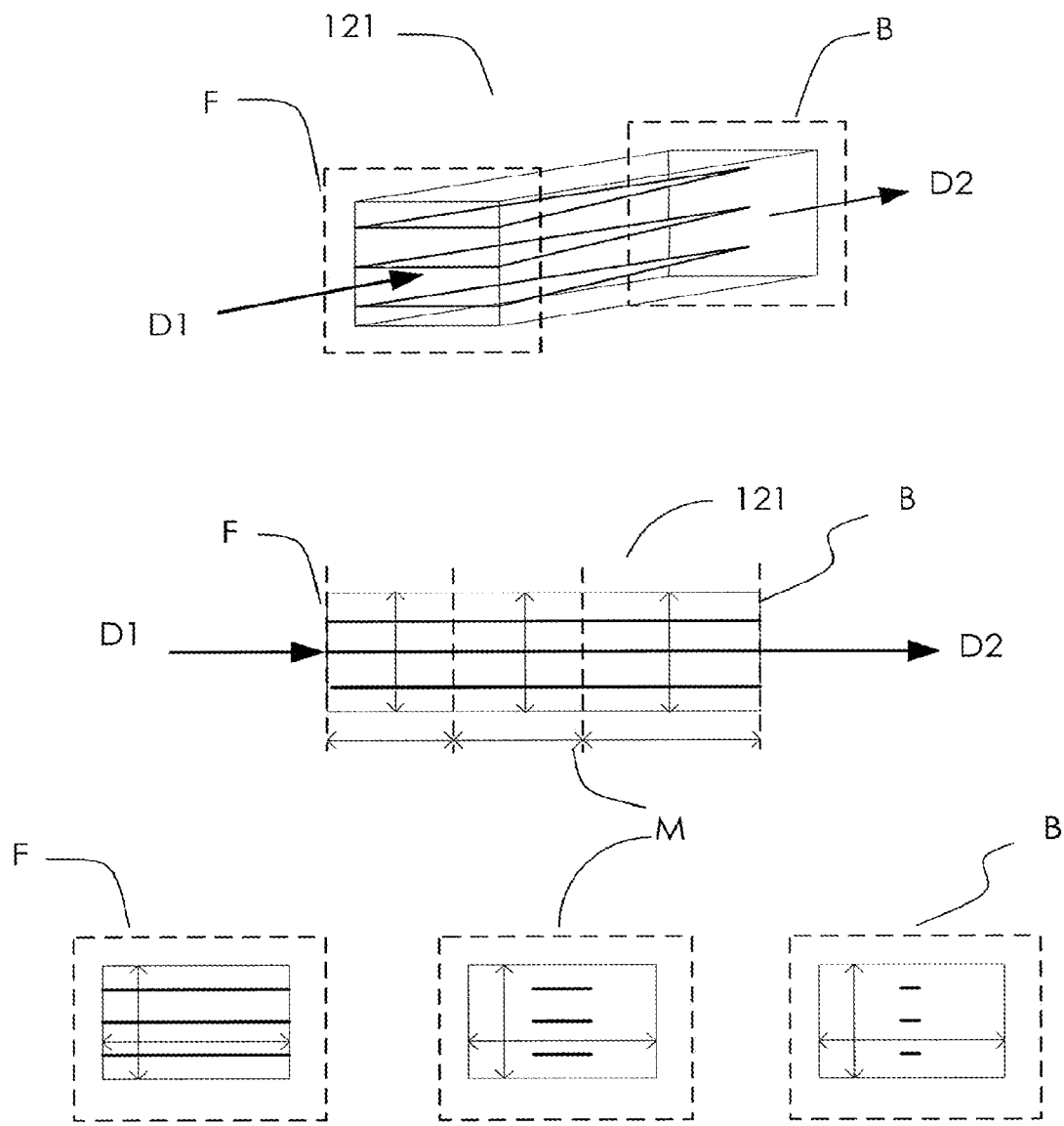
Figure 22:
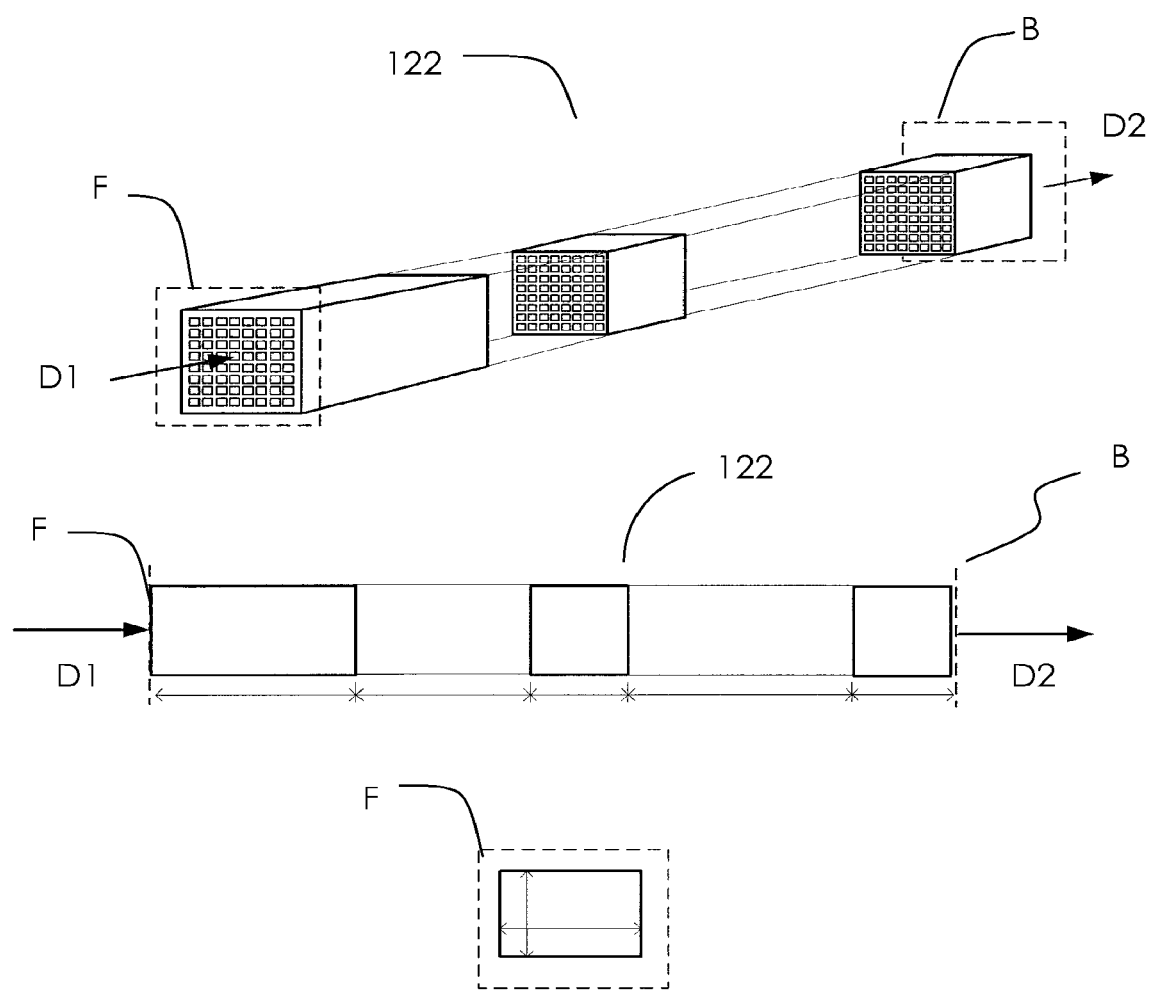

In some embodiments, the volumetric adsorptive properties of the adsorbent volumes may be deceased along the vapor flow path. By way of non-limiting example, the volumetric incremental capacity and butane working capacity (BWC) of the adsorbent volumes may be decreased towards the vent direction of the canister system. The diminished volumetric adsorptive properties may be attained by modifying the properties of the separate sections of adsorbent, by varying the size of the gaps between adsorbent nominal volumes (FIG. 19), by adjusting the dimensions of individual adsorbent nominal volumes, separately (FIGS. 20 and 21), or by a combination thereof (FIG. 22). By way of non-limiting examples, as shown in FIGS. 20 and 21, the canister system (120, 121) may include adsorbent volume sections "F," "M," and "B" along the flow path in the direction of D1 to D2. The effective butane working capacities (BWC) of the adsorbent volume sections may be decreased along the flow path in the direction of D1 to D2 (i.e., the effective BWC of the adsorbent volume section F>the effective BWC of the adsorbent volume section M>the effective BWC of the adsorbent volume section B). In some embodiments, the effective BWC of the adsorbent volume section M and/or section B may be less than 3 g/dL, while the effective BWC of the canister system may be more than or equal to 3 g/dl.

In a particular embodiment, the evaporative emission control system include: a fuel tank for storing fuel; an engine having an air induction system and adapted to consume the fuel; an evaporative emission control canister system comprising one or more canister(s); a fuel vapor inlet conduit from the fuel tank to the canister system; a fuel vapor purge conduit from the canister system to the air induction system of the engine; and a vent conduit for venting the canister system when the engine is off and for admission of purge air to the canister system when the engine is on. The evaporative emission control canister system is defined by a fuel vapor flow path from the fuel vapor inlet conduit to the initial adsorbent volume toward the at least one subsequent adsorbent volume and the vent conduit, and by an air flow path from the vent conduit to the at least one subsequent adsorbent volume toward the initial adsorbent volume and the fuel vapor purge conduit. The evaporative emission control canister system includes an initial adsorbent volume having an effective incremental adsorption capacity at 25° C. of greater than 35 grams n-butane/L between vapor concentration of 5 vol % and 50 vol % n-butane; and at least one subsequent adsorbent volume having an effective incremental adsorption capacity at 25° C. of less than about 35 grams n-butane/L between vapor concentration of 5 vol % and 50 vol % n-butane, wherein the subsequent adsorbent volume is configured to have or exhibit at least one of: (i) an approximately uniform air and vapor flow distribution across its flow path cross section, (ii) an effective butane working capacity (BWC) of less than about 3 g/dL and a g-total BWC of from about 2 to about 6 grams, or (iii) a combination thereof; wherein the initial adsorbent volume and the subsequent adsorbent volume are connected to permit sequential contact by fuel vapor. In certain embodiments, the subsequent adsorbent volume is configured to comprise an approximately uniform structure, which facilitates an approximately uniform air and vapor flow distribution. The initial adsorbent volume and the at least one subsequent adsorbent volume are located within a single canister, or the initial adsorbent volume and the at least one subsequent adsorbent volume are located in separate canisters that are connected to permit sequential contact by fuel vapor. The evaporative emission control canister system has a two-day diurnal breathing loss (DBL) emissions of no more than 20 mg at no more than about 210 liters of purge applied after the 40 g/hr BETP butane loading step.

In some embodiments, the evaporative emission control system may include a heat unit to further enhance the purge efficiency. By way of non-limiting example, the evaporative emission control system may include a heat unit for heating the purge air, at least one subsequent adsorbent volume, or both.

The adsorbents suitable for use in the adsorbent volumes may be derived from many different materials and in various forms. It may be a single component or a blend of different components. Furthermore, the adsorbent (either as a single component or a blend of different components) may include a volumetric diluent. Non-limiting examples of the volumetric diluents may include, but are not limited to, spacer, inert gap, foams, fibers, springs, or combinations thereof.

Any known adsorbent materials may be used including, but not limited to, activated carbon, carbon charcoal, zeolites, clays, porous polymers, porous alumina, porous silica, molecular sieves, kaolin, titania, ceria, or combinations thereof. Activated carbon may be derived from various carbon precursors. By way of non-limiting example, the carbon precursors may be wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables such as rice hull or straw, synthetic polymer, natural polymer, lignocellulosic material, or combinations thereof. Furthermore, activated carbon may be produced using a variety of processes including, but are not limited to, chemical activation, thermal activation, or combinations thereof.

A variety of adsorbent forms may be used. Non-limiting examples of the adsorbent forms may include granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, or combinations thereof. The adsorbent (either as a single component or a blend of different components) may include a volumetric diluent. Non-limiting examples of the volumetric diluents may include, but are not limited to, spacer, inert gap, foams, fibers, springs, or combinations thereof. Furthermore, the adsorbents may be extruded into special thin-walled cross-sectional shapes, such as pelletized cylindrical, hollow-cylinder, star, twisted spiral, asterisk, configured ribbons, or other shapes within the technical capabilities of the art. In shaping, inorganic and/or organic binders may be used.

The honeycomb and monolith adsorbents may be in any geometrical shape including, but are not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Adsorbent volumes with similar nonuniform flow as a square cell grid in a cylindrical monolith include, for example, a particulate or extrudate adsorbent fill in a relatively narrow cross-sectional filter container. (The looser local packing of the particulate or extrudate at and near the container walls enables preferential flow at the wall, compared with flow towards the center line of the flow path.) Another example is a wound or stacked sheet adsorbent volume, or a square cross-section extruded adsorbent volume that, by virtue of design or fabrication, has a distribution of cell sizes, despite in theory allowing for a uniform air and vapor flow distribution. Without being bound by any theory, it is believed that the more uniform cell cross-sectional areas across the honeycomb faces, the more uniform flow distribution within the part during both adsorption and purge cycles, and, therefore, lower DBL emissions from the canister system. Nonetheless, if the flow is nonuniform, then the prescribed subsequent adsorbent volume with 2-6 g-total BWC and <3 g/dL effective BWC of the current invention also provides a remedy.

In some embodiments, the evaporative emission control system may further include one or more heat input unit(s) for heating one or more adsorbent volume(s) and/or one or more empty volume(s). The heat input units may include, but are not limited to, internal resistive elements, external resistive elements, or heat input units associated with the adsorbent. The heat input unit associated with the adsorbent may be an element separate from the adsorbent (i.e., non-contacted with adsorbents). Alternatively, the heat input unit associated with the adsorbent may be a substrate or layer on to which the adsorbent is attached, bonded, non-bonded, or in physical contact. The heat input unit associated with the adsorbent may be adsorbent directly heated electrically by having appropriate resistivity. The resistivity properties of the adsorbent may be modified by the addition of conductive or resistive additives and binders in the original preparation of the adsorbent and/or in the forming of the adsorbent into particulate or monolithic forms. The conductive component may be conductive adsorbents, conductive substrates, conductive additives and/or conductive binders. The conductive material may be added in adsorbent preparation, added in intermediate shaping process, and/or added in adsorbent shaping into final form. Any mode of heat input unit may be used. By way of non-limiting example, the heat input unit may include a heat transfer fluid, a heat exchanger, a heat conductive element, and positive temperature coefficient materials. The heat input unit may or may not be uniform along the heated fluid path length (i.e., provide different local intensities). Furthermore, the heat input unit may or may not be distributed for greater intensity and duration of heating at different points along the heated fluid path length.

Examples

Determination of Incremental Adsorption Capacity

Figure 8:
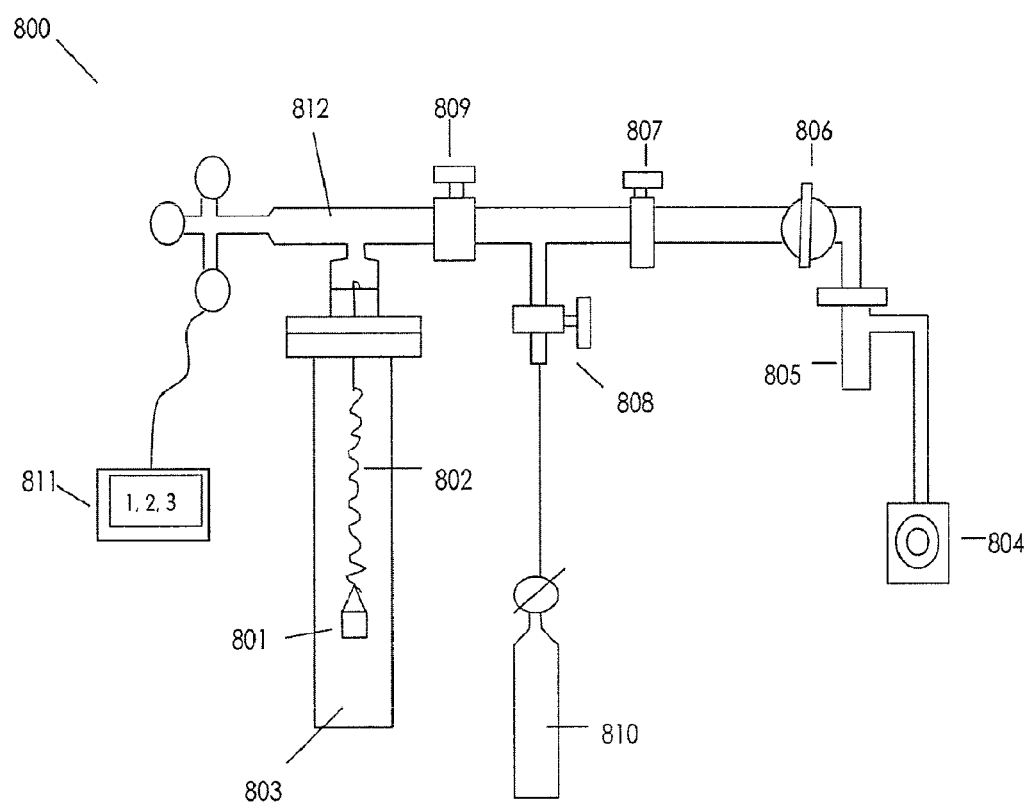
FIG. 8 is a simplified schematic drawing of the apparatus used for the determination of the butane adsorption capacity.

FIG. 8 shows a simplified schematic drawing of the apparatus used for the determination of the butane adsorption capacity. This is known in the field as the McBain method. The apparatus 800 includes a sample pan 801 and a spring 802 inside a sample tube 803, a rough vacuum pump 804, a diffusion pump 805, a stopcock 806, metal/O-ring vacuum valves 807-809, a butane cylinder 810, a pressure readout unit 811, and at least one conduit 812 connecting the components of the apparatus 800.

The representative adsorbent component sample ("adsorbent sample") was oven-dried for more than 3 hours at 110° C. before loading onto the sample pan 801 attached to the spring 802 inside the sample tube 803. Then, the sample tube 803 was installed into the apparatus 800. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the nominal volume.

A vacuum of less than 1 torr was applied to the sample tube, and the adsorbent sample was heated at 105° C. for 1 hour. The mass of the adsorbent sample was then determined by the extension amount of the spring using a cathetometer. After that, the sample tube was immersed in a temperature-controlled water bath at 25° C. Air was pumped out of the sample tube until the pressure inside the sample tube was $10^{-4}$ torr. n-Butane was introduced into the sample tube until equilibrium was reached at a selected pressure. The tests were performed for two data sets of four selected equilibrium pressures each, taken about 38 torr and taken about 380 torr. The concentration of n-butane was based on the equilibrium pressure inside the sample tube. After each test at the selected equilibrium pressure, the mass of the adsorbent sample was measured based on the extension amount of the spring using cathetometer. The increased mass of the adsorbent sample was the amount of n-butane adsorbed by the adsorbent sample. The mass of n-butane adsorbed (in gram) per the mass of the adsorbent sample (in gram) was determined for each test at different n-butane equilibrium pressures and plotted in a graph as a function of the concentration of n-butane (in % volume). A 5 vol % n-butane concentration (in volume) at one atmosphere is provided by the equilibrium pressure inside the sample tube of 38 torr. A 50 vol % n-butane concentration at one atmosphere is provided by the equilibrium pressure inside the sample tube of 380 torr. Because equilibration at precisely 38 torr and 380 torr may not be readily obtained, the mass of adsorbed n-butane per mass of the adsorbent sample at 5 vol % n-butane concentration and at 50 vol % n-butane concentration were interpolated from the graph using the data points collected about the target 38 and 380 torr pressures.

Alternatively, Micromeritics (such as Micromeritics ASAP 2020) may be used for determining the incremental butane adsorption capacity instead of the McBain method.

Determination of Diurnal Breathing Loss (DBL) Emissions

The evaporative emission control systems of EXAMPLES 1-15 (identified below) were assembled with the selected amounts and types of adsorbents as shown in TABLES 1-3 (details for EXAMPLES 14 and 15 are described below).

Each example was uniformly preconditioned (aged) by repetitive cycling of gasoline vapor adsorption using certified TF-1 fuel (9 RVP, 10 vol % ethanol) and 300 nominal bed volumes of dry air purge at 22.7 LPM based on the main canister (e.g., 630 liters for a 2.1 L main canister and 450 liters for a 1.5 L main canister). The gasoline vapor load rate was 40 g/hr and the hydrocarbon composition was 50 vol %, generated by heating two liters of gasoline to about 36° C. and bubbling air through at 200 ml/min. The two-liter aliquot of fuel was replaced automatically with fresh gasoline every two hours until 5000 ppm breakthrough was detected by a FID (flame ionization detector). A minimum of 25 aging cycles were used on a virgin canister. The aging cycles were followed by a single butane adsorption/air purge step. This step was to load butane at 40 g/hour at a 50 vol % concentration in air at one atm to 5000 ppm breakthrough, soak for one hour, then purge with dry air for 21 minutes with a total purge volume attained by selecting the appropriate constant air purge rate for that period. The canister was then soaked with the ports sealed for 24 hour at 20° C.

The DBL emissions were subsequently generated by attaching the tank port of the example to a fuel tank filled 40 vol % (based on its rated volume) with CARB Phase II fuel (7 RVP, 0% ethanol). Prior to attachment, the filled fuel tank had been stabilized at 18.3° C. for 24 hours while venting. The tank and the example were then temperature-cycled per CARB's two-day temperature profile, each day from 18.3° C. to 40.6° C. over 11 hours, then back down to 18.3° C. over 13 hours. Emission samples were collected from the example vent at 5.5 hours and 11 hours during the heat-up stage into Kynar bags. The Kynar bags were filled with nitrogen to a known total volume based on pressure and then evacuated into a FID to determine hydrocarbon concentration. The FID was calibrated with a 5000 ppm n-butane standard. From the Kynar bag volume, the emissions concentration, and assuming an ideal gas, the mass of emissions (as butane) was calculated. For each day, the mass of emissions at 5.5 hours and 11 hours were added. Following CARB's protocol the day with the highest total emissions was reported as "2-day emissions." In all cases, the highest emissions were on Day 2. This procedure is generally described in SAE Technical Paper 2001-01-0733, titled "Impact and Control of Canister Bleed Emissions," by R. S. Williams and C. R. Clontz, and in CARB's LEV III BETP procedure (section D.12 in California Evaporative Emissions Standards and Test Procedures for 2001 and Subsequent Model Motor Vehicles, Mar. 22, 2012).

For EXAMPLES 1-4, EXAMPLES 13-15, and EXAMPLES 7-8, a 68 L fuel tank and a 2.1 liter main canister (TABLE 1, Main Canister Type #1) was used as a main canister having fuel-source side volumes (i.e., an initial adsorbent volume) filled with 1.8 liters of NUCHAR® BAX 1500 activated carbon adsorbent and a vent-side volume filled with 0.3 liters of NUCHAR® BAX LBE activated carbon adsorbent. The volumes were configured such that there was a 1500 ml fuel-source side chamber and a 600 ml vent-side chamber, where the fuel-source chamber had a cross sectional area (CSA) that was 2.5 times the vent-side CSA. The BAX 1500 activated carbon filled the fuel source chamber (similar to volumes 201 plus 202 in FIGS. 2-7) and 300 mL of the immediate downstream volume in the vent-side chamber (similar to volume 203 in FIGS. 2-7). The 300 mL of the BAX LBE activated carbon filled the remaining volume of the vent-side chamber (similar to volume 204 in FIG. 7). NUCHAR® BAX 1500 activated and NUCHAR® BAX LBE activated carbon are wood-based activated carbon products, commercially available from MeadWestvaco Corporation, having an incremental adsorption capacity at 25° C. of 73 grams n-butane/L and 24 grams n-butane/L respectively, between vapor concentration of 5 vol % and 50 vol % n-butane ("Nominal Incremental Capacity" in TABLE 1). For the post-butane loading air purge step, each canister system in EXAMPLES 1-4, EXAMPLES 13-15 and EXAMPLES 7-8 was purged with 157.5 liters of purge air at a purge rate of 7.5 lpm. In terms of bed volume ratios of purge volume divided by the total nominal volume of the canister systems, the purge applied was between 66.0 and 75.0 bed volumes (BV).

For EXAMPLES 5-6 and 9-12, a 45 L fuel tank and a 1.5 liter main canister (TABLE 1, Main Canister Type #2) was used as a main canister having fuel-source side volumes (i.e., an initial adsorbent volume) filled with 1.2 liters of NUCHAR® BAX 1100 activated carbon adsorbent and a vent-side volume filled with 0.3 liters of NUCHAR® BAX LBE activated carbon adsorbent. The volumes were configured such that there was a 1000 ml fuel-source side chamber and a 500 ml vent-side chamber, where the fuel-source chamber had a cross sectional area (CSA) that was 2.0 times the vent-side CSA. The BAX 1100 activated carbon filled the fuel source chamber (similar to volumes 201 plus 202 in FIGS. 2-7) and 200 mL of the immediate downstream volume in the vent-side chamber (similar to volume 203 in FIGS. 2-7). The 300 mL of the BAX LBE activated carbon filled the remaining volume of the vent-side chamber (similar to volume 204 in FIG. 7). NUCHAR® BAX 1100 activated is a wood-based activated carbon product, commercially available from MeadWestvaco Corporation, having an incremental adsorption capacity at 25° C. of 52 grams n-butane/L between vapor concentration of 5 vol % and 50 vol % n-butane. During the post-butane loading air purge step, each canister system example was purged with either 100 or 150 liters of purge air at a purge rate of 4.76 or 7.14 lpm, respectively. In terms of bed volume ratios of purge volume divided by the total nominal volume of the canister systems, the purge applied was between 55.9 and 91.2 BV.

EXAMPLES 1-13 each included none, one, or two additional vent-side adsorbent volumes in-series. The first supplemental canister downstream along the vapor flow path from the main canister (if present) was noted as "Adsorbent 1" and a second in-series supplemental canister (if present) downstream along the vapor flow path from Adsorbent 1 was noted as "Adsorbent 2." One type of additional vent-side adsorbent (similar to supplemental canister 300 in FIG. 4) was described as "35×150," which was a 35 mm diameter×150 mm long, 200 cells per square inch (cpsi) cylindrical carbon honeycomb. The accounting of the effective volume for the "35×150" adsorbent was the same boundaries as shown in FIG. 9, that is, the effective volume was bounded by the vapor entrance and exit faces of the honeycomb, and equal to its nominal volume. The second type of additional vent-side adsorbent (similar to supplemental canister 300 in FIG. 7) was described as "3-35×50," which was three 35 mm diameter×50 mm long, 200 cpsi cylindrical carbon honeycombs, including two 35 mm diameter×7 mm thick foam spacers. Each foam spacer created a 7 mL voidage gap between each sequential 50 mm long honeycomb length, similar to gaps 304 and 305 in FIG. 7. The accounting of the effective volume was the same boundaries as shown in FIG. 17, that is, the effective volume was bounded by the vapor entrance face of the first of the three honeycombs and exit faces of the third of the three honeycombs, and equal to the nominal volumes of the three honeycombs plus the volumes of the 7-mm thick spacers. The nominal incremental adsorption capacity at 25° C. of n-butane/L between vapor concentration of 5 vol % and 50 vol % n-butane was shown as the "Nominal Incremental Capacity." When based on the effective volume, the incremental adsorption capacity at 25° C. of n-butane/L between vapor concentration of 5 vol % and 50 vol % n-butane was shown as the "Effective Incremental Capacity." The two-day DBL emissions were reported as the "2-day DBL Emissions" in units of mg. The reported results were often the average of several replicates of the BETP in order to verify findings.

The evaporative emission control canister system of EXAMPLES 1-4, EXAMPLES 13-15 and EXAMPLES 7-8 each included an initial adsorbent volume of BAX 1500 activated carbon adsorbent having a nominal incremental adsorption capacity at 25° C. of 73 g n-butane/L (i.e., more than 35 g/L) between vapor concentration of 5 vol % and 50 vol % n-butane, and a subsequent adsorbent volume of BAX LBE activated carbon adsorbent having a nominal incremental adsorption capacity at 25° C. of 24 g/L (less than 35 g/L) between vapor concentration of 5 vol % and 50 vol % n-butane (less than 35 g/L). This is main canister type #1 in TABLE 1.

EXAMPLE 1 was the evaporative emission control canister system disclosed in the U.S. Pat. No. RE38,844. As shown in TABLE 2, the evaporative emission control canister system of EXAMPLE 1 provided a 2-day DBL Emissions of 215 mg under a low purge condition of 75 bed volume (BV) of purge air after butane loading (i.e., 157.5 liters). These 2-day DBL Emissions were more than an order of magnitude above the 20 mg regulation limit under the California Bleed Emissions Test Procedure (BETP). Thus, the 20 mg regulation limits under the California Bleed Emissions Test Procedure (BETP) could not be achieved by the evaporative emission control canister system disclosed in the U.S. Pat. No. RE38,844.

For EXAMPLE 2, an additional vent-side adsorbent volume (Adsorbent 1) was added to EXAMPLE 1 in the form of an activated carbon honeycomb ("35×150") having an effective incremental adsorption capacity at 25° C. of 16 g/L (less than 35 g/L) between vapor concentration of 5 vol % and 50 vol % n-butane (less than 35 g/L), an effective BWC of 4.2 g/dL and a g-total BWC of 6.1 g. As shown in TABLE 2, the 2-day DBL Emissions for EXAMPLE 2 with a low purge level of 157.5 liters (applied after butane loading) was 74 mg, which was still above the 20 mg regulation limit under the California Bleed Emissions Test Procedure (BETP). Thus, at the purge level of 157.5 liters applied after butane loading, the evaporative emission control canister system of the U.S. Pat. No. RE38,844 still could not satisfy the 20 mg regulation limit under BETP even when it was used in combination with the additional vent-side adsorbent volume (Adsorbent 1).

For EXAMPLE 3, a second additional vent-side adsorbent volume in the form of a activated carbon honeycomb (Adsorbent 2) of the same type and properties as Adsorbent 1 ("35×150") was added to the canister system of EXAMPLE 2. Surprisingly, as shown in TABLE 2, there was only a marginal reduction in the 2-day DBL emissions from the additional vent-side adsorbent volume in EXAMPLE 3, to 70 mg and still above the 20 mg regulation limit under the California Bleed Emissions Test Procedure (BETP).

EXAMPLE 4 was a variation of EXAMPLE 3 in that the activated carbon honeycombs were each divided in to three 50 mm long section with narrow spacers in between. For EXAMPLE 4, the spacers reduced the effective incremental capacities of Adsorbents 1 and 2 to 14.6 g/L and reduced the effective BWC to 3.9 g/dL, but, by definition, kept the g-total BWC the same, at 6.1 g. As shown in TABLE 2, the 2-day DBL emissions of EXAMPLE 4 remained high at 52 mg and were still above the 20 mg regulation limits under the California Bleed Emissions Test Procedure (BETP).

In EXAMPLE 13, Adsorbent 2 was honeycombs divided into two 50 mm long sections with a narrow spacer in between. The effective incremental capacity was 6.1 g/L and the effective BWC was 1.6 g/dL. By definition, the g-total BWC was 1.6 g. As shown in TABLE 2, the 2-day DBL emissions of EXAMPLE 13 remained high at 35 mg and were still above the 20 mg regulation limits under the California Bleed Emissions Test Procedure (BETP).

For EXAMPLE 7, Adsorbent 2 had an effective incremental capacity of 9.8 g/L, an effective BWC of 2.6 g/dL and a g-total BWC of 4.0 g. For EXAMPLE 8, Adsorbent 2 had an effective incremental capacity of 10.7 g/L, an effective BWC of 2.8 g/dL and a g-total BWC of 4.4 g. As shown in TABLE 2, with 157.5 liters of purge, the canister systems of EXAMPLES 7 and 8 provided the 2-day DBL Emissions of 10.3 g/dl and 13 g/dl, respectively. Thus, the canister systems of EXAMPLES 7 and 8 had the 2-day DBL Emissions well below the BETP requirement of less than 20 mg for low purge conditions of 157.5 liters (66.0 BV).

EXAMPLE 14 was identical to EXAMPLE 3, except that the "35×150" 200 cpsi square grid in a cylindrical honeycomb Adsorbent 2 was replaced with a 200 cpsi square grid, 150 mm long rectangular solid honeycomb (overall cross section of a 31 mm×31 mm square with uniform cell size and shape across the cross-sectional face; see FIG. 9 for a representation of the general geometry) that had the same volume, BWC, and incremental capacity properties as the "35×150" Adsorbent 2 in EXAMPLE 3. The 2-day DBL Emissions for EXAMPLE 14 were 17 mg, and were well below the BETP requirement of less than 20 mg for low purge conditions of 157.5 liters (66.0 BV). Therefore, by changing the adsorbent design to create uniform flow distribution across the adsorbent volume cross-section of Adsorbent 2 from EXAMPLE 3 to EXAMPLE 14, a reduction in emissions by over 75% was attained.

EXAMPLE 15 was identical to EXAMPLE 4, except that the "3-35×50" 200 cpsi square grid in a cylindrical honeycomb Adsorbent 2 was replaced with three similarly assembled 200 cpsi square grid, 50 mm long rectangular solid honeycomb with the thin foam spacers (each 50 mm piece had an overall cross section of a 31 mm×31 mm square with uniform cell size and shape across the cross-sectional face; see FIG. 9 for general geometry) that had the same volume, BWC, and incremental capacity properties as the "3-35×50" Adsorbent 2 in EXAMPLE 3. The 2-day DBL Emissions for EXAMPLE 15 were 17 mg, and were well below the BETP requirement of less than 20 mg for low purge conditions of 157.5 liters (66.0 BV). Therefore, by changing the adsorbent design to create uniform flow distribution across the adsorbent volume cross-section of Adsorbent 2 from EXAMPLE 4 to EXAMPLE 14, a reduction in emissions by over 67% was attained. In fact, the complexities of a sectioned adsorbent volume of Adsorbent 2 in EXAMPLE 15 could be entirely avoided, given the identical 2-day DBL emissions performance demonstrated by the unsectioned Adsorbent 2 in EXAMPLE 14.

Figure 23:
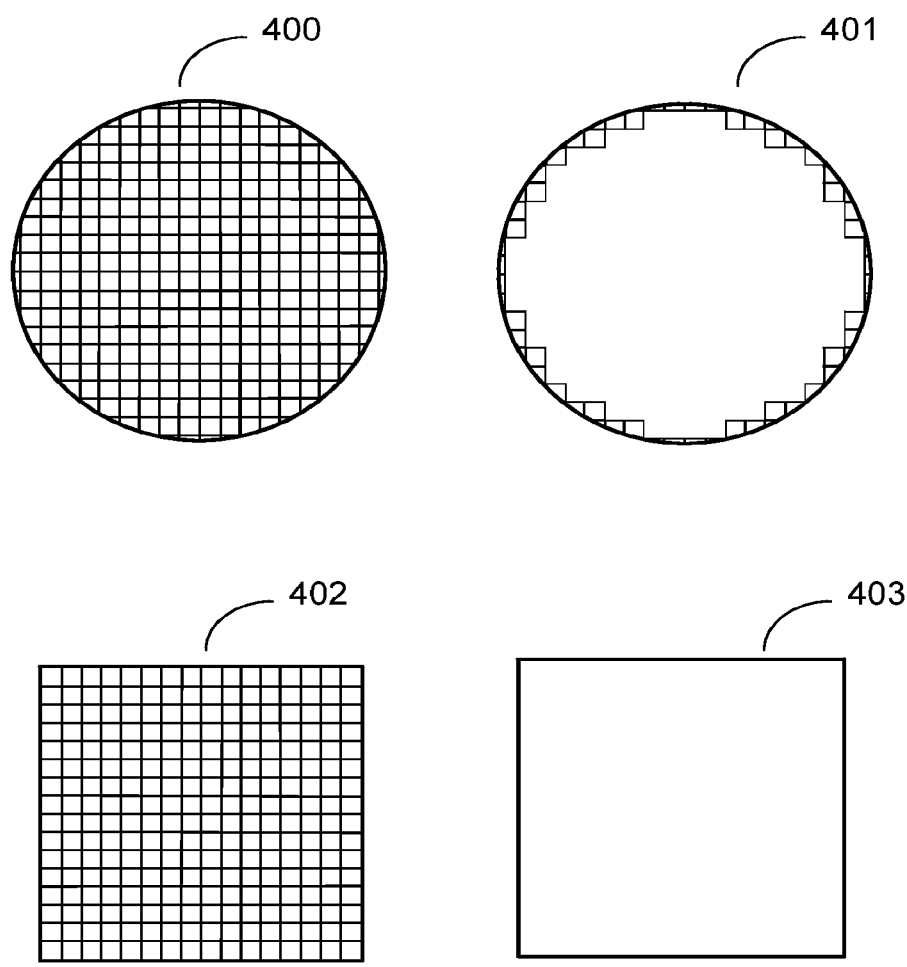
FIG. 23 is a comparative representation of a cross section of a 35 mm diameter cylindrical activated carbon honeycomb with a 200 cell per square inch (cpsi) internal wall grid and cross section of a 31 mm×31 mm square carbon honeycomb with a 200 cpsi internal wall grid.

The exaggerated effect from a small proportion of partial cells within the activated carbon honeycomb cross section was surprising. The effect of only about 20% of the cells having partial cross sectional area for air and vapor flow was a difference of four- or three-fold higher 2-day DBL emissions by the cylindrical parts in EXAMPLES 3 and 4, compared with the square parts in EXAMPLES 14 and 15, respectively. For example, FIG. 23 shows a cross section of a 35 mm diameter cylindrical activated carbon honeycomb with a 200 cpsi internal wall grid (400) and the fraction of the square cells that have partial cross sectional areas at the periphery (highlighted by 401, the illustrative elimination of the full cross sectional cells from 400). For 200 cpsi, the cell density is about 0.31 cell per $mm^2$, or about 3.2 $mm^2$ per cell. The cells of full cross section amount to 240 in number, or 774 $mm^2$, compared with 962 $mm^2$ for the full cross sectional area. Therefore, about 20% of the cross sectional area has partial cross sectional area (0.20=1−744/962). By comparison, the 31 mm×31 mm square activated carbon honeycomb (402) has no cells with partial cross sectional area (highlighted by 403, the illustrative elimination of the full cross sectional cells from 402).

The evaporative emission control canister system of EXAMPLES 5, 6 and 9-12 were based on the main canister type #2 in TABLE 1.

EXAMPLE 12 was the evaporative emission control canister system similar to those disclosed in the U.S. Pat. No. RE38,844. As shown in TABLE 3, the evaporative emission control canister system of EXAMPLE 12 did not include any additional adsorbent volume on the vent side. EXAMPLE 12 provided 2-day DBL Emissions of 175 mg under a low purge condition of 100 bed volume (BV) of purge air after butane loading (i.e., 150 liters), which was about nine time higher than the 20 mg regulation limit under the California Bleed Emissions Test Procedure (BETP). This confirmed that the evaporative emission control canister system similar to those disclosed in the U.S. Pat. No. RE38,844 was not able to achieve the 2-day DBL Emissions requirements under the BETP (i.e., less than 20 mg) when low purge was used.

In EXAMPLE 5, a low volume of purge after butane loading 150 liters was applied, or 91.2 BV for the 1.5 L nominal volume of the canister system that included an additional vent-side adsorbent volume of a "35×150" activated carbon honeycomb as Adsorbent 1. As shown in TABLE 3, the 2-day DBL emissions were high at 57 mg and above the 20 mg regulation limit under the California Bleed Emissions Test Procedure (BETP).

For EXAMPLE 6, the purge applied was reduced to 100 liters, or 55.9 BV for the main canister type #2 that included the same additional vent-side adsorbent volumes as EXAMPLE 4. As shown in TABLE 3, the 2-Day DBL emissions were high at 80 mg and above the 20 mg regulation limits under the California Bleed Emissions Test Procedure (BETP).

The canister systems of EXAMPLES 9, 10 and 11 each included an initial adsorbent volume of NUCHAR® BAX 1100 activated carbon adsorbent having an incremental adsorption capacity at 25° C. of 52 g n-butane/L between vapor concentration of 5 vol % and 50 vol % n-butane (i.e., more than 35 g/L) as part of the main canister type #2, and at least one subsequent adsorbent volume ("Adsorbent 2" in TABLE 3) having an effective incremental adsorption capacity at 25° C. butane adsorption capacity of less than 35 g/L between vapor concentration of 5 vol % and 50 vol % n-butane and a g-total BWC of between 2 and 6 g.

Adsorbent 2 in EXAMPLE 9 had an effective incremental capacity of 11.7 g/L, an effective BWC of 3.1 g/dL (greater than 3 g/dL) and a g-total BWC of 4.8 g. As shown in TABLE 3, the 2-day DBL emissions for EXAMPLE 9 under the low purge of 100 liters (i.e., 55.9 BV) were 51 mg and well above the BETP requirement of less than 20 mg.

In contrast, Adsorbent 2 in EXAMPLE 10 had an effective incremental capacity of 9.8 g/L, an effective BWC of 2.6 g/dL (less than 3 g/dL) and a g-total BWC of 4.0 g. As shown in TABLE 3, the 2-day DBL emissions under the low purge of 100 liters, equal to 55.9 BV, were 13.0 mg and within the BETP requirement of less than 20 mg.

Likewise, Adsorbent 2 in EXAMPLE 11 had an effective incremental capacity of 5.9 g/L, an effective BWC of 1.6 g/dL (less than 3 g/dL) and a g-total BWC of 2.4 g. As shown in TABLE 3, the 2-day DBL emissions under the low purge of 150 liters, equal to 83.9 BV, were 7.3 mg and within the BETP requirement of less than 20 mg.

TABLE 4 and TABLE 5 summarized the conditions of the canister systems of EXAMPLES 1-13, and their measured 2-day DBL emissions. The canister systems of EXAMPLES 7, 8, 10 and 11 provided the 2-day DBL emissions of less than 20 mg, as required under the California Bleed Emissions Test Procedure (BETP). The requirement not to exceed 20 mg for BETP under low purge was met by satisfying a window of adsorptive properties by a vent-side volume, where the window was an effective BWC of less than 3 g/dL and a g-total BWC of between 2 g and 6 g. Thus, the means to achieve the BETP emissions requirement under low purge conditions was more than only a reduction in the working capacity or incremental capacity across the vapor flow path of the canister system and specifically of the vent-side adsorbent volume to a prescribed level, but to additionally have sufficient gram working capacity in that vent-side volume to restrain the emissions.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, equivalents, and alternatives falling within the scope of the present disclosure as defined by the following appended claims and their legal equivalents.

While several embodiments of the invention have been shown and described herein, it will be understood that such embodiments are provided by way of example only. Numerous variations, changes and substitutions will occur to those skilled in the art without departing from the spirit of the invention. Accordingly, it is intended that the description and appended claims cover all such variations as fall within the spirit and scope of the invention.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

TABLE 1

| Main Canister Type | #1 | #2 |
|---|---|---|
| Fuel Side Nominal Volume (mL) | 1800 | 1200 |
| Adsorbent Type | BAX 1500 | BAX 1100 |
| Nominal Incremental Capacity (g/L) | 73 | 52 |
| Nominal Apparent Density (g/mL) | 0.295 | 0.363 |
| Vent Side Nominal Volume (mL) | 300 | 300 |
| Adsorbent Type | BAX LBE | BAX LBE |
| Nominal Incremental Capacity (g/L) | 24 | 24 |
| Nominal Apparent Density (g/mL) | 0.393 | 0.393 |
| Fuel Tank Size (rated L) | 68 | 45 |

TABLE 2

| EXAMPLE | 1 | 2 | 3 | 4 | 13 | 7 | 8 |
|---|---|---|---|---|---|---|---|
| Main Canister Type | #1 | #1 | #1 | #1 | #1 | #1 | #1 |
| Additional Vent Side Adsorbents Volumes: | | | | | | | |
| Adsorbent 1 Nominal Volume (mL) | None | 144 | 144 | 144 | 144 | 144 | 144 |
| Adsorbent 1 Type | None | "35 × 150" | "35 × 150" | "3-35 × 50" | "3-35 × 50" | "3-35 × 50" | "3-35 × 50" |
| Adsorbent 1 Effective Volume (mL) | None | 144 | 144 | 158 | 158 | 158 | 158 |
| Nominal Incremental Capacity (g/L) | — | 16.0 | 16.0 | 16.0 | 16.0 | 16.0 | 16.0 |
| Effective Incremental Capacity (g/L) | — | 16.0 | 16.0 | 14.6 | 14.6 | 14.6 | 14.6 |
| Nominal Apparent Density (g/mL) | — | 0.377 | 0.377 | 0.377 | 0.377 | 0.377 | 0.377 |
| Effective Apparent Density (g/mL) | — | 0.377 | 0.377 | 0.345 | 0.345 | 0.345 | 0.345 |
| Nominal BWC (g/dL) | — | 4.2 | 4.2 | 4.2 | 4.2 | 4.2 | 4.2 |
| Effective BWC (g/dL) | — | 4.2 | 4.2 | 3.8 | 3.8 | 3.8 | 3.8 |
| g-Total BWC (g) | — | 6.1 | 6.1 | 6.1 | 6.1 | 6.1 | 6.1 |
| Adsorbent 2 Nominal Volume (mL) | None | None | 144 | 144 | 96 | 144 | 144 |
| Adsorbent 2 Type | None | None | "35 × 150" | "3-35 × 50" | "2-35 × 50" | "3-35 × 50" | "3-35 × 50" |
| Adsorbent 2 Effective Volume (mL) | None | None | 144 | 158 | 103 | 158 | 158 |
| Nominal Incremental Capacity (g/L) | — | — | 16.0 | 16.0 | 6.5 | 10.7 | 11.7 |
| Effective Incremental Capacity (g/L) | — | — | 16.0 | 14.6 | 6.1 | 9.8 | 10.7 |
| Nominal Apparent Density (g/mL) | — | — | 0.377 | 0.377 | 0.559 | 0.493 | 0.487 |
| Effective Apparent Density (g/mL) | — | — | 0.377 | 0.345 | 0.522 | 0.451 | 0.446 |
| Nominal BWC (g/dL) | — | — | 4.2 | 4.2 | 1.7 | 2.8 | 3.1 |
| Effective BWC (g/dL) | — | — | 4.2 | 3.8 | 1.6 | 2.6 | 2.8 |
| g-Total BWC (g) | — | — | 6.1 | 6.1 | 1.6 | 4.0 | 4.4 |
| Total Nominal Volume of Canister System (L) | 2.10 | 2.24 | 2.39 | 2.39 | 2.34 | 2.39 | 2.39 |
| Purge Applied After the 40 g/hr Butane Loading Step, liters | 157.5 | 157.5 | 157.5 | 157.5 | 157.5 | 157.5 | 157.5 |
| Purge Applied After the 40 g/hr Butane Loading Step, BV | 75.0 | 70.2 | 66.0 | 66.0 | 67.3 | 66.0 | 66.0 |

TABLE 3

| EXAMPLE | 12 | 5 | 6 | 9 | 10 | 11 |
|---|---|---|---|---|---|---|
| Main Canister Type | #2 | #2 | #2 | #2 | #2 | #2 |
| Additional Vent Side Adsorbents Volumes: | | | | | | |
| Adsorbent 1 Nominal Volume (mL) | None | 144 | 144 | 144 | 144 | 144 |
| Adsorbent 1 Type | None | "35 × 150" | "3-35 × 50" | "3-35 × 50" | "3-35 × 50" | "3-35 × 50" |
| Adsorbent 1 Effective Volume (mL) | None | 144 | 158 | 158 | 158 | 158 |
| Nominal Incremental Capacity (g/L) | — | 16.0 | 16.0 | 16.0 | 16.0 | 16.0 |
| Effective Incremental Capacity (g/L) | — | 16.0 | 14.6 | 14.6 | 14.6 | 14.6 |
| Nominal Apparent Density (g/mL) | — | 0.377 | 0.377 | 0.377 | 0.377 | 0.377 |
| Effective Apparent Density (g/mL) | — | 0.377 | 0.345 | 0.345 | 0.345 | 0.345 |
| Nominal BWC (g/dL) | — | 4.2 | 4.2 | 4.2 | 4.2 | 4.2 |
| Effective BWC (g/dL) | — | 4.2 | 3.8 | 3.8 | 3.8 | 3.8 |
| g-Total BWC (g) | — | 6.1 | 6.1 | 6.1 | 6.1 | 6.1 |
| Adsorbent 2 Nominal Volume (mL) | None | None | 144 | 144 | 144 | 144 |
| Adsorbent 2 Type | None | None | "3-35 × 50" | "3-35 × 50" | "3-35 × 50" | "3-35 × 50" |
| Adsorbent 2 Effective Volume (mL) | None | None | 158 | 158 | 158 | 158 |
| Nominal Incremental Capacity (g/L) | — | — | 16.0 | 12.8 | 10.7 | 6.5 |
| Effective Incremental Capacity (g/L) | — | — | 14.6 | 11.7 | 9.8 | 5.9 |
| Nominal Apparent Density (g/mL) | — | — | 0.377 | 0.438 | 0.493 | 0.558 |
| Effective Apparent Density (g/mL) | — | — | 0.345 | 0.399 | 0.451 | 0.511 |
| Nominal BWC (g/dL) | — | — | 4.2 | 3.4 | 2.8 | 1.7 |

TABLE 3-continued

| EXAMPLE | 12 | 5 | 6 | 9 | 10 | 11 |
|---|---|---|---|---|---|---|
| Effective BWC (g/dL) | — | — | 3.8 | 3.1 | 2.6 | 1.6 |
| g-Total BWC (g) | — | — | 6.1 | 4.8 | 4.0 | 2.4 |
| Total Nominal Volume of Canister System (L) | 1.50 | 1.64 | 1.79 | 1.79 | 1.79 | 1.79 |
| Purge Applied After the 40 g/hr Butane Loading Step, liters | 150 | 150 | 100 | 100 | 100 | 150 |
| Purge Applied After the 40 g/hr Butane Loading Step, BV | 100 | 91.2 | 55.9 | 55.9 | 55.9 | 83.9 |
| 2-Day DBL Emissions, mg | 175 | 57 | 80 | 51 | 13 | 7.3 |

TABLE 4

| Main Canister Type #1 | EX. 1 | EX. 2 | EX. 3 | EX. 4 | EX. 13 | EX. 7 | EX. 8 |
|---|---|---|---|---|---|---|---|
| Fuel side | | | | | | | |
| Effective Incremental Adsorption Capacity, g/L | 73 | 73 | 73 | 73 | 73 | 73 | 73 |
| Vent Side | | | | | | | |
| Adsorbent Volume #0 | | | | | | | |
| Effective Incremental Adsorption Capacity, g/L | 24 | 24 | 24 | 24 | 24 | 24 | 24 |
| Effective BWC, g/dL | 6.3 | 6.3 | 6.3 | 6.3 | 6.3 | 6.3 | 6.3 |
| g-Total BWC, g | 18.9 | 18.9 | 18.9 | 18.9 | 18.9 | 18.9 | 18.9 |
| Adsorbent Volume #1 | | | | | | | |
| Effective Incremental Adsorption Capacity, g/L | N/A | 16.0 | 16.0 | 16.0 | 14.6 | 14.6 | 14.6 |
| Effective BWC, g/dL | N/A | 4.2 | 4.2 | 4.2 | 4.2 | 3.8 | 3.8 |
| g-Total BWC, g | N/A | 6.1 | 6.1 | 6.1 | 6.1 | 6.1 | 6.1 |
| Adsorbent Volume #2 | | | | | | | |
| Effective Incremental Adsorption Capacity, g/L | N/A | N/A | 16.0 | 14.6 | 6.1 | 7.3 | 8.0 |
| Effective BWC, g/dL | N/A | N/A | 4.2 | 3.8 | 1.6 | 2.6 | 2.8 |
| g-Total BWC, g | N/A | N/A | 6.1 | 6.1 | 1.6 | 4.0 | 4.4 |
| 2-Day DBL Emission, mg | 215 | 74 | 70 | 52 | 35 | 10.3 | 13 |

TABLE 5

| Main Canister Type #2 | EX. 12 | EX. 5 | EX. 6 | EX. 9 | EX. 10 | EX. 11 |
|---|---|---|---|---|---|---|
| Fuel side | | | | | | |
| Effective Incremental Adsorption Capacity, g/L | 52 | 52 | 52 | 52 | 52 | 52 |
| Vent Side | | | | | | |
| Adsorbent Volume #0 | | | | | | |
| Effective Incremental Adsorption Capacity, g/L | 24 | 24 | 24 | 24 | 24 | 24 |
| Effective BWC, g/dL | 6.3 | 6.3 | 6.3 | 6.3 | 6.3 | 6.3 |
| g-Total BWC, g | 18.9 | 18.9 | 18.9 | 18.9 | 18.9 | 18.9 |
| Adsorbent Volume #1 | | | | | | |
| Effective Incremental Adsorption Capacity, g/L | N/A | 16.0 | 14.6 | 14.6 | 14.6 | 14.6 |
| Effective BWC, g/dL | N/A | 4.2 | 3.8 | 3.8 | 3.8 | 3.8 |
| g-Total BWC, g | N/A | 6.1 | 6.1 | 6.1 | 6.1 | 6.1 |
| Adsorbent Volume #2 | | | | | | |
| Effective Incremental Adsorption Capacity, g/L | N/A | N/A | 14.6 | 11.7 | 7.3 | 2.7 |
| Effective BWC, g/dL | N/A | N/A | 3.8 | 3.1 | 2.6 | 1.6 |
| g-Total BWC, g | N/A | N/A | 6.1 | 4.8 | 4.0 | 2.4 |
| 2-Day DBL Emission, mg | 175 | 57 | 80 | 51 | 13 | 7.3 |

The invention claimed is:

1. A low-purge evaporative emissions control canister system comprising:
   a fuel-side adsorbent volume having an effective incremental adsorption capacity at 25° C. of greater than 35 grams n-butane/L between vapor concentration of 5 vol % and 50 vol % n-butane; and
   at least one vent-side adsorbent volume having an effective incremental adsorption capacity at 25° C. of less than 35 grams n-butane/L between vapor concentration of 5 vol % and 50 vol % n-butane,
   wherein the at least one vent-side adsorbent volume is a honeycomb structure configured without partial cells which facilitates uniform air and vapor flow distribution and an effective butane working capacity (BWC) of less than about 4.2 g/dL or a g-total BWC of less than about 6.1 grams or a combination thereof,
   wherein the fuel-side and at least one vent-side adsorbent volumes are in fluid communication, and wherein the canister system has a two-day diurnal breathing loss (DBL) emissions of no more than 20 mg at no more than about 210 liters of purge applied after a 40 g/hr BETP butane loading step, and low-purge is defined as no more than about 210 liters of purge applied after a 40 g/hr BETP butane loading step.

2. The canister system of claim 1, wherein the system comprises a plurality of the at least one vent-side adsorbent volumes.

3. The canister system of claim 1, wherein the fuel-side adsorbent volume and at least one vent-side adsorbent volume are located within a single canister.

4. The canister system of claim 1, wherein the fuel-side adsorbent volume and at least one vent-side adsorbent volumes are located within separate canisters, and wherein the adsorbent volumes are in fluid communication.

5. The canister system of claim 4, further comprising at least one additional vent-side adsorbent volume located within a separate canister, wherein adsorbent volumes are in fluid communication.

6. The canister system of claim 1, comprising a single vent-side adsorbent volume.

7. The canister system of claim 1, wherein the fuel-side adsorbent volume, the at least one vent-side adsorbent volume, or both includes an adsorbent selected from the group consisting of activated carbon, carbon charcoal, zeolites, clays, porous polymers, porous alumina, porous silica, molecular sieves, kaolin, titania, ceria, and combinations thereof.

8. The canister system of claim 7, wherein the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

9. The canister system of claim 1, wherein the at least one vent-side adsorbent volume includes a volumetric diluent.

10. The canister system of claim 9, wherein the volumetric diluent includes a member selected from the group consisting of inert spacer particles, trapped air spaces, foams, fibers, screens, and combinations thereof.

11. The canister system of claim 9, wherein the volumetric diluent includes an adsorbent material formed into a high voidage shape selected from the group consisting of stars, hollow tubes, asterisks, spirals, cylinders, configured ribbons, honeycombs, monoliths, and combinations thereof.

12. The canister system of claim 1, wherein the canister system has a two-day diurnal breathing loss (DBL) emissions of no more than 20 mg at no more than 157.5 liters of purge applied after the 40 g/hr BETP butane loading step.

13. The canister system of claim 1, wherein the canister system has a two-day diurnal breathing loss (DBL) emissions of no more than 20 mg at no more than about 100 bed volume of purge applied after the 40 g/hr BETP butane loading step.

14. The canister system of claim 1, wherein the canister system has a two-day diurnal breathing loss (DBL) emissions of no more than 20 mg at no more than about 75 bed volume of purge applied after the 40 g/hr BETP butane loading step.

15. An evaporative emissions control system, comprising:
   a fuel tank for storing fuel;
   an engine having an air induction system and adapted to consume the fuel;
   an evaporative emission control canister system having a two-day diurnal breathing loss (DBL) emissions of no more than 20 mg at no more than about 210 liters of purge applied after a 40 g/hr butane loading step, the canister system comprising:
   a fuel-side adsorbent volume having an effective incremental adsorption capacity at 25° C. of greater than 35 grams n-butane/L between vapor concentration of 5 vol % and 50 vol % n-butane;
   at least one vent-side adsorbent volume having an effective incremental adsorption capacity at 25° C. of less than 35 grams n-butane/L between vapor concentration of 5 vol % and 50 vol % n-butane, wherein the at least one vent-side adsorbent volume is a honeycomb structure configured without partial cells that facilitates uniform air and vapor flow distribution and an effective butane working capacity (BWC) of less than about 4.2 g/dL or a g-total BWC of less than about 6.1 grams or a combination thereof;
   a fuel vapor inlet conduit connecting the evaporative emission control canister system to the fuel tank;
   a fuel vapor purge conduit connecting the evaporative emission control canister system to the air induction system of the engine; and
   a vent conduit for venting the evaporative emission control canister system and for admission of purge air to the evaporative emission control canister system;
   wherein the evaporative emission control canister system is defined by a fuel vapor flow path from the fuel vapor inlet conduit to the fuel-side adsorbent volume toward the at least one vent-side adsorbent volume and the vent conduit, and by an air flow path from the vent conduit to the at least one vent-side adsorbent volume toward the fuel-side adsorbent volume and the fuel vapor purge outlet.

16. The evaporative emissions control system of claim 15, wherein the canister system comprises one or more canisters.

17. The evaporative emission control system of claim 15, wherein the fuel-side adsorbent volume and the at least one vent-side adsorbent volume of the canister system are located within a single canister.

18. The evaporative emission control system of claim 15, wherein the fuel-side adsorbent volume and the at least one vent-side adsorbent volume are located in separate canisters, and wherein the adsorbent volumes are in fluid communication.

19. The evaporative emission control system of claim 18, further comprising at least one additional vent-side adsorbent volume located within a separate canister, wherein the adsorbent volumes are in fluid communication.

20. The evaporative emission control system of claim 15, further comprising a heat unit.

21. The evaporative emission control system of claim 15, wherein the canister system has a two-day diurnal breathing loss (DBL) emissions of no more than 20 mg at no more than 157.5 liters of purge applied after the 40 g/hr BETP butane loading step.

22. The evaporative emission control system of claim 15, wherein the canister system has a two-day diurnal breathing loss (DBL) emissions of no more than 20 mg at no more than 100 BV of purge applied after the 40 g/hr BETP butane loading step.

23. The evaporative emission control system of claim 22, wherein the canister system has a two-day diurnal breathing loss (DBL) emissions of no more than 20 mg at no more than 75 BV of purge applied after the 40 g/hr BETP butane loading step.

24. A method for reducing fuel vapor emissions in an evaporative emission control system, the method comprising contacting the fuel vapor with:
    a fuel-side adsorbent volume having an effective incremental adsorption capacity at 25° C. of greater than 35 grams n-butane/L between vapor concentration of 5 vol % and 50 vol % n-butane; and
    at least one vent-side adsorbent volume having an effective incremental adsorption capacity at 25° C. of less than 35 grams n-butane/L between vapor concentration of 5 vol % and 50 vol % n-butane, wherein the at least one vent-side adsorbent volume is a honeycomb structure configured without partial cells that facilitates uniform air and vapor flow distribution and an effective butane working capacity (BWC) of less than about 4.2 g/dL or a g-total BWC of at least about 6.1 grams or a combination thereof,
    wherein the fuel-side adsorbent volume and the at least one vent-side adsorbent volume are connected to permit sequential contact by fuel vapor, and wherein the canister system has a two-day diurnal breathing loss (DBL) emissions of no more than 20 mg at no more than about 210 liters of purge applied after a 40 g/hr BETP butane loading step.

25. The method of claim 24, wherein the fuel-side adsorbent volume and the at least one vent-side adsorbent volume are located within a single canister.

26. The method of claim 24, wherein the fuel-side adsorbent volume and the at least one vent-side adsorbent volume are located within separate canisters, and wherein the adsorbent volumes are in fluid communication.

27. The method of claim 26, further comprising at least one additional vent-side adsorbent volume located within a separate canister, and wherein the adsorbent volumes are in fluid communication.

28. The method of claim 24, wherein the method has a two-day diurnal breathing loss (DBL) emissions of no more than 20 mg at no more than about 157.5 liters of purge applied after the 40 g/hr BETP butane loading step.

29. The method of claim 24, wherein the method has a two-day diurnal breathing loss (DBL) emissions of no more than 20 mg at no more than 100 BV of purge applied after the 40 g/hr BETP butane loading step.

\* \* \* \* \*